(12) United States Patent
Kadota et al.

(10) Patent No.: US 11,834,033 B2
(45) Date of Patent: Dec. 5, 2023

(54) REGENERATIVE BRAKING SYSTEM AND ELECTRICALLY-DRIVEN WORK VEHICLE USING REGENERATIVE BRAKING SYSTEM

(71) Applicant: Hitachi Construction Machinery Co., Ltd., Tokyo (JP)

(72) Inventors: Mitsuhiro Kadota, Tokyo (JP); Masatsugu Arai, Tsuchiura (JP); Takayuki Satou, Tsuchiura (JP); Naoki Fukuda, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 307 days.

(21) Appl. No.: 17/293,949

(22) PCT Filed: Nov. 27, 2019

(86) PCT No.: PCT/JP2019/046336
§ 371 (c)(1),
(2) Date: May 14, 2021

(87) PCT Pub. No.: WO2020/116272
PCT Pub. Date: Jun. 11, 2020

(65) Prior Publication Data
US 2022/0001854 A1 Jan. 6, 2022

(30) Foreign Application Priority Data
Dec. 5, 2018 (JP) .................................. 2018-228377

(51) Int. Cl.
*G06F 11/00* (2006.01)
*B60W 20/50* (2016.01)
(Continued)

(52) U.S. Cl.
CPC ............... *B60W 20/50* (2013.01); *B60K 6/26* (2013.01); *B60L 3/003* (2013.01); *B60L 7/12* (2013.01);
(Continued)

(58) Field of Classification Search
CPC .......... B60W 20/50; B60W 2300/125; B60W 30/18127; B60K 6/26; B60K 6/46;
(Continued)

(56) References Cited

U.S. PATENT DOCUMENTS 8,040,081 B2 * 10/2011 Shimana ............... H02P 29/032
363/71
8,045,301 B2 * 10/2011 Shiba ........................ B60L 9/18
363/55
(Continued)

FOREIGN PATENT DOCUMENTS

JP 2008-113548 A 5/2008
JP 2009-33943 A 2/2009
(Continued)

OTHER PUBLICATIONS

Regenerative Braking in Electric Vehicle Using Quadratic Gain Bidirectional Converter (Year: 2022).*
(Continued)

*Primary Examiner* — Ronnie M Mancho
(74) *Attorney, Agent, or Firm* — Crowell & Moring LLP

(57) ABSTRACT

A power regeneration device 21 that converts the power of a main engine DC line 16 connected to a main engine power generator 12 through a rectification circuit 14 to supply the converted power to an accessory DC line 34 connected to an accessory power generator 31 through a rectification circuit 32 includes a plurality of power conversion modules 221 to 22N configured such that input sections 221*a* to 22N*a* are connected in series. The main engine power generator 12
(Continued)

and a power consumption device 15 are controlled such that a voltage input to the power regeneration device 21 does not exceed a voltage upper limit value Vm and a portion between a positive electrode terminal (+) and a negative electrode terminal (−) of each of the input sections of the power conversion modules to be stopped is short-circuited by a bypass device and the voltage upper limit value Vm is decreased when some of the plurality of power conversion modules 221 to 22N are stopped. With this configuration, operational continuity can be improved while a device size increase is prevented.

11 Claims, 12 Drawing Sheets

(51) Int. Cl.
    *B60K 6/26*      (2007.10)
    *B60L 3/00*      (2019.01)
    *B60L 7/12*      (2006.01)
    *B60L 7/16*      (2006.01)

(52) U.S. Cl.
    CPC .......... *B60L 7/16* (2013.01); *B60W 2300/125* (2013.01); *B60Y 2200/92* (2013.01)

(58) Field of Classification Search
    CPC .... B60L 3/003; B60L 7/12; B60L 7/16; B60L 3/0023; B60L 7/22; B60L 2240/427; B60L 7/14; B60L 2200/40; B60L 50/15; B60L 50/61; B60Y 2200/92; B60Y 2400/3086; H02M 1/325; H02M 1/0074; H02M 1/0077; H02M 1/322; Y02T 10/64; Y02T 10/70; Y02T 10/7072
    USPC .......................................................... 701/22
    See application file for complete search history.

(56) References Cited

U.S. PATENT DOCUMENTS

| | | | | |
|---|---|---|---|---|
| 8,103,396 B2* | 1/2012 | Mitsutani | ............. | B60L 3/0069 701/22 |
| 8,473,136 B2* | 6/2013 | Kato | ...................... | B60L 50/62 180/65.21 |
| 8,773,065 B2* | 7/2014 | Ang | ....................... | B60L 53/14 320/140 |
| 9,030,788 B2* | 5/2015 | Yamamoto | ............. | B60L 58/10 361/23 |
| 9,169,764 B2* | 10/2015 | Hashimoto | ............. | B60L 53/14 |
| 9,774,215 B2* | 9/2017 | Mizuno | ................. | B60L 3/0092 |
| 9,948,219 B2* | 4/2018 | Saha | ....................... | H02P 27/06 |
| 9,950,632 B2* | 4/2018 | Katsumata | ................ | H02P 5/74 |
| 9,998,061 B2* | 6/2018 | Shinohara | ............. | H02P 29/024 |
| 10,003,273 B2* | 6/2018 | Takubo | ................... | H02M 7/48 |
| 10,202,042 B2* | 2/2019 | Yamane | ................. | B60L 15/02 |
| 10,583,743 B2* | 3/2020 | Takada | ...................... | B60K 6/46 |
| 2008/0084714 A1 | 4/2008 | Kawasaki et al. | | |
| 2010/0030412 A1* | 2/2010 | Mitsutani | ................ | F16H 61/12 701/22 |
| 2012/0109442 A1* | 5/2012 | Kato | ..................... | H02J 7/0024 701/22 |
| 2014/0343776 A1* | 11/2014 | Ang | ......................... | H02J 7/02 701/22 |
| 2016/0129796 A1* | 5/2016 | Tomura | ................. | B60W 20/00 903/906 |
| 2016/0248316 A1* | 8/2016 | Mizuno | ..................... | B60L 3/04 |
| 2018/0272871 A1* | 9/2018 | Takada | .................... | B60L 1/003 |
| 2022/0001854 A1* | 1/2022 | Kadota | ................ | B60L 3/0023 |

FOREIGN PATENT DOCUMENTS

| | | |
|---|---|---|
| JP | 2015-98746 A | 5/2015 |
| JP | 2018-152172 A | 9/2018 |

OTHER PUBLICATIONS

International Preliminary Report on Patentability (PCT/IB/338 & PCT/IB/373) issued in PCT Application No. PCT/JP2019/046336 dated Jun. 17, 2021, including English translation of document C2 (Japanese-language Written Opinion (PCT/ISA/237) previously filed on May 14, 2021) (six (6) pages).

International Search Report (PCT/ISA/210) issued in PCT Application No. PCT/JP2019/046336 dated Feb. 4, 2020 with English translation (four (4) pages).

Japanese-language Written Opinion (PCT/ISA/237) issued in PCT Application No. PCT/JP2019/046336 dated Feb. 4, 2020 (three (3) pages).

* cited by examiner

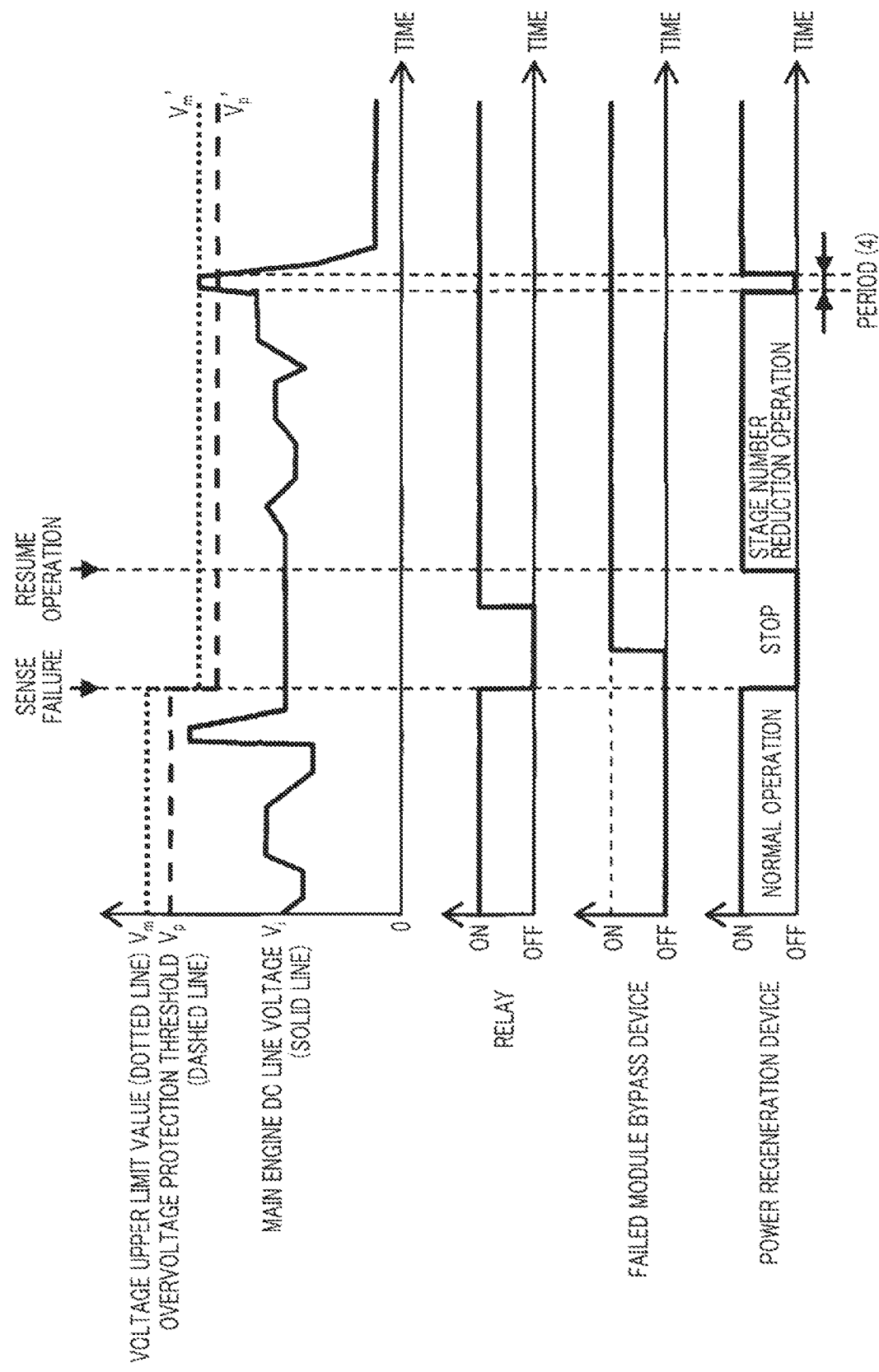

REGENERATIVE BRAKING SYSTEM AND ELECTRICALLY-DRIVEN WORK VEHICLE USING REGENERATIVE BRAKING SYSTEM

TECHNICAL FIELD

The present invention relates to a regenerative braking system and an electrically-driven work vehicle using the regenerative braking system.

BACKGROUND ART

In recent years, against a background of fossil fuel depletion and global environmental issue worsening, an electric vehicle utilizing electric energy, such as a hybrid automobile or an electric automobile, has received increasing attention, and has been in practical use. For example, various electrically-driven work vehicles have been used on locations in mines, and an electrically-driven dump truck and the like have been used as a work vehicle for the purpose of delivery. Some electrically-driven dump trucks use an electric drive system that converts power generated by a main engine power generator connected to an engine by an inverter to drive a travel motor. In the dump truck on which such an electric drive system is mounted, a so-called regenerative braking system supplying regenerative power generated by the travel motor upon retard (braking) to an accessory is mounted, and thus energy saving and fuel consumption amount reduction can be achieved.

In the regenerative braking system, there is a voltage difference between a main engine system connected to the travel motor and an accessory system. Thus, a power regeneration device converting the voltage of a DC line connected to the travel motor inverter to output the resultant voltage to a DC line connected to the accessory is necessary. Generally, the main engine system and the accessory system need to be electrically insulated from each other, and therefore, a portion between an input and an output is insulated using a transformer in the power regeneration device. Meanwhile, in an electrically-driven work vehicle with a great vehicle body weight, such as a dump truck, the voltage of a DC line of a main engine system is generally high, and therefore, a power regeneration device needs to handle a high voltage input.

As the technique for handling such an high voltage input, Patent Document 1 discloses, for example, a direct high-voltage inverter device obtaining a three-phase high-voltage output by an U, V, W-phase configuration in which output ends of a plurality of single-phase inverters are connected in series, an output end of a single auxiliary single-phase inverter is connected in series with each of the U, V, and W-phase output ends, and switches capable of separately short-circuiting the U, V, and W-phase output ends of the single-phase inverters and the output ends of the auxiliary single-phase inverters are provided. Further, the output ends of the auxiliary single-phase inverters are brought into a short-circuit state by the switches to operate each of the U, V, and W-phase single-phase inverters in normal operation, and when at least one of the U, V, and W-phase single-phase inverters is failed, the output end of the failed single-phase inverter is brought into the short-circuit state by the switch and the switch of the auxiliary single-phase inverter with the same phase as that of the failed single-phase inverter is opened, and device operation is resumed by operation of such an auxiliary single-phase inverter.

PRIOR ART DOCUMENT

Patent Documents

Patent Document 1: JP-2009-33943-A

SUMMARY OF THE INVENTION

Problem to be Solved by the Invention

In the above-described prior art, the single-phase inverter as a power conversion device is taken as a module, and a plurality of modules is connected in series to form a single power conversion device. Thus, voltage applied to each module forming the power conversion device is distributed (divided), and therefore, the voltage applied to each module decreases. For this reason, a high voltage can be handled using low-withstand-voltage modules.

In the above-described prior art, when failure has occurred or the need has arisen to perform maintenance, a portion between output terminals is brought into a bypass (short-circuit) state by the switch as bypass means connected to the output of each module, and in this manner, some modules are stopped and operation can be continued by the remaining modules. Moreover, the auxiliary modules are provided, and when some modules are stopped, operation is continued using the auxiliary modules without the need for decreasing the output voltage.

However, in the above-described prior art, the auxiliary modules need to be provided, and for this reason, there is a problem that the entirety of the power conversion device is increased in size by an amount corresponding to these auxiliary modules. The bypass means (the switch) of each module may be short-circuited to stop some modules, and operation may be continued by the remaining modules. However, in this case, the voltage to be applied to the remaining modules increases. For this reason, the withstand voltage of each module component needs to be increased in advance and an insulation distance in each module needs to be ensured so that each module can withstand the increased voltage. Thus, in this case, there is also a problem that the module is increased in size, i.e., the entirety of the power conversion device is increased in size.

The present invention has been made in view of the above-described problems, and is intended to provide a regenerative braking system capable of improving operational continuity while preventing a device size increase and an electrically-driven work vehicle using the regenerative braking system.

Means for Solving the Problem

The present application includes plural types of means for solving the above-described problems. One example is a regenerative braking system including a first power generator and a second power generator that are connected to an engine, a first rectification circuit that is connected to the first power generator and rectifies an output power of the first power generator to output a DC power to a first DC line, an inverter that is connected to between the first DC line and a travel motor, a power consumption device that is connected to the first DC line and is able to consume a power of the first DC line, a second rectification circuit that is connected to the second power generator and rectifies an output power of the second power generator to output a DC power to a second DC line, an accessory device that is connected to the second DC line, a power regeneration device that converts the power of the first DC line to supply the converted power to the second DC line, and a controller that controls the first power generator, the power consumption device, and the power regeneration device. The power regeneration device includes a plurality of power conversion modules configured such that input sections to which the power from the first DC line is input are connected in series, and a first bypass device group that is connected to each of the input sections of the plurality of power conversion modules and is able to separately short-circuit a portion between positive and negative electrode terminals of each of the input sections. The controller is configured to control the first power generator, the power consumption device, and the power regeneration device such that a voltage input from the first DC line to the power regeneration device does not exceed a variable upper limit value based on the total of withstand voltage properties of the plurality of power conversion modules. The controller is configured to short-circuit, when some of the plurality of power conversion modules are stopped, the portion between the positive and negative electrode terminals of each of the input sections of the some of the plurality of power conversion modules to be stopped and decrease the variable upper limit value according to the withstand voltage properties of the some of the plurality of power conversion modules to be stopped.

Advantages of the Invention

According to the present invention, the regenerative braking system capable of improving the operational continuity while preventing a device size increase and the electrically-driven work vehicle using the regenerative braking system can be provided.

BRIEF DESCRIPTION OF THE DRAWINGS

FIG. 14 is a graph showing a temporal change in a voltage upper limit value and an input voltage and ON/OFF states of a relay, a bypass device of a power conversion module detected as failed, and a power regeneration device in the processing by a regenerative braking system according to other embodiments.

MODES FOR CARRYING OUT THE INVENTION

Hereinafter, embodiments of the present invention will be described with reference to the drawings. Note that in the present embodiments, an electrically-driven dump truck will be described as one example of an electrically-driven work vehicle. However, the present invention is also applicable to other electrically-driven work vehicles such as an electrically-driven wheel loader.

First Embodiment

A first embodiment of the present invention will be described with reference to FIGS. 1 to 7.

Figure 1:
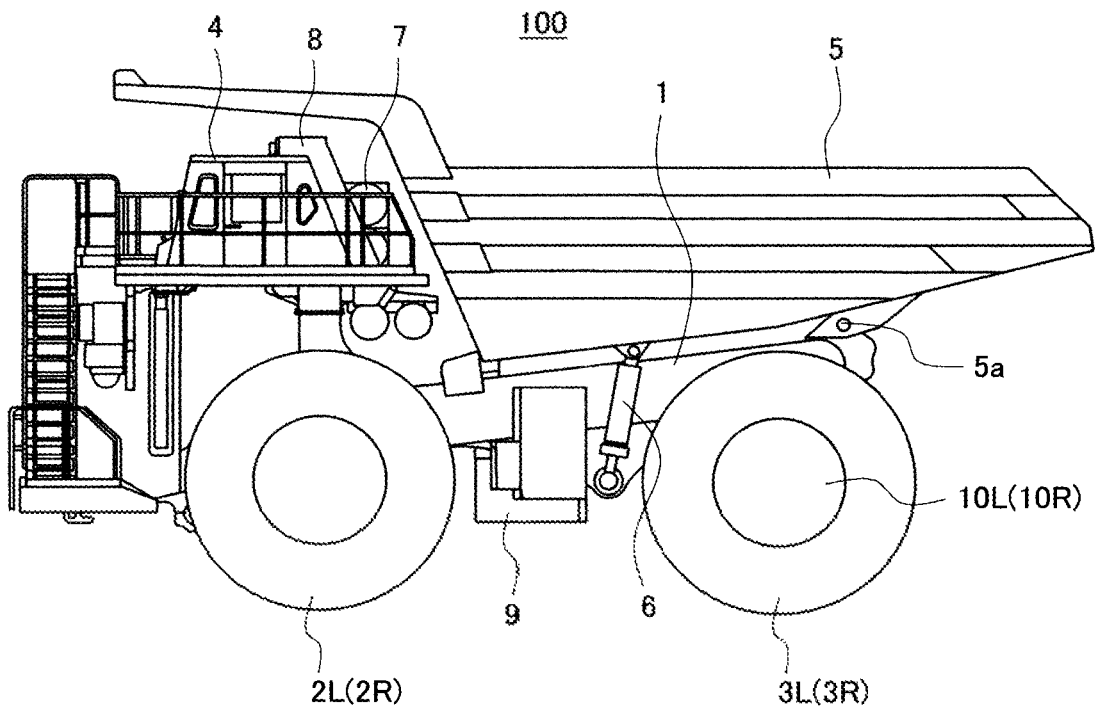
FIG. 1 is a side view schematically showing an outer appearance of an electrically-driven dump truck according to a first embodiment.
Figure 2:
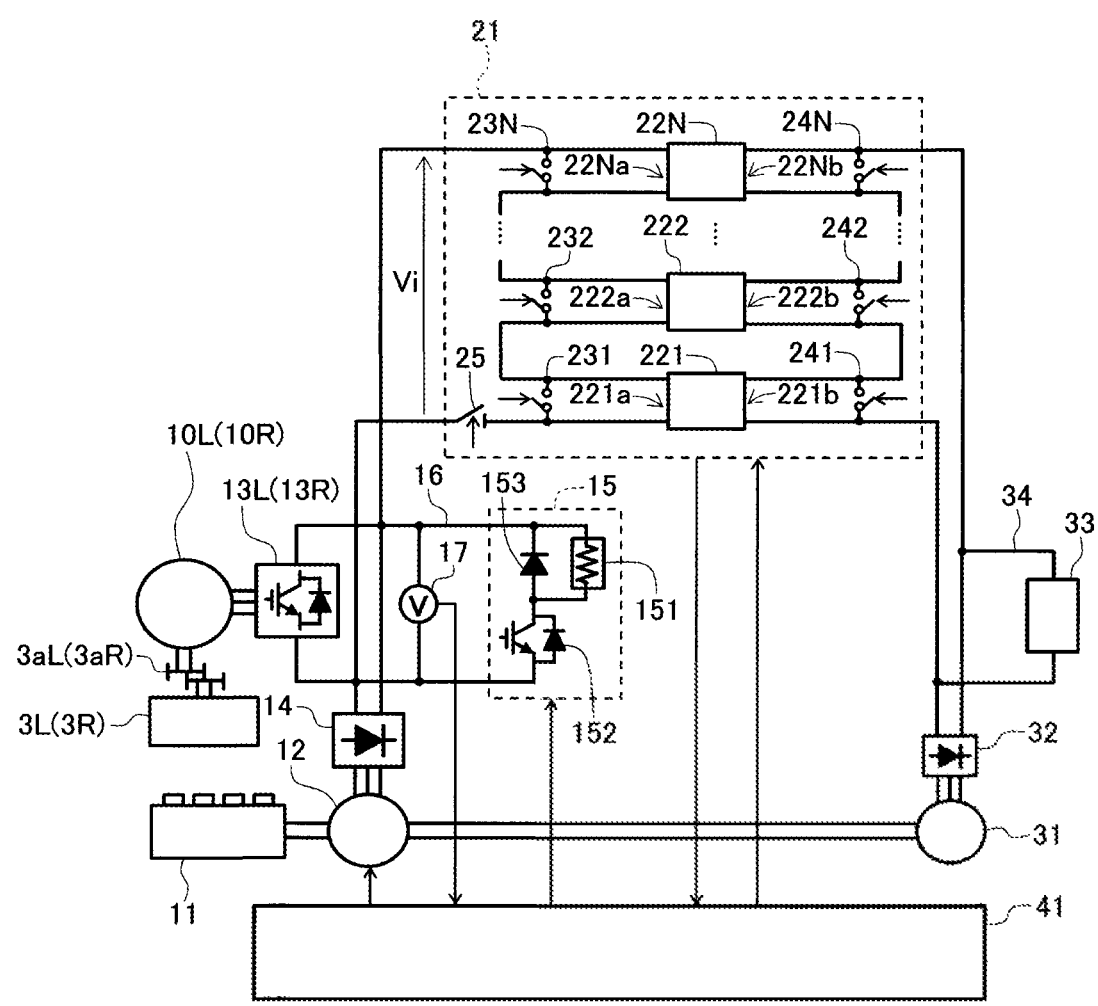
FIG. 2 is a diagram schematically showing an electric drive system of the electrically-driven dump truck including a regenerative braking system according to the first embodiment.

FIG. 1 is a side view schematically showing an outer appearance of an electrically-driven dump truck according to the present embodiment. Moreover, FIG. 2 is a diagram schematically showing an electric drive system of the electrically-driven dump truck including a regenerative braking system. In FIGS. 1 and 2, only one of a pair of right and left configurations such as driven wheels, drive wheels, and travel motors is shown with reference numerals, and the other configuration is not shown in the figures and only reference numerals thereof are shown in parentheses in the figures.

In FIGS. 1 and 2, the electrically-driven dump truck 100 generally includes a vehicle body frame 1 extending in a front-rear direction to form a support structure, a bed (a vessel) 5 arranged so as to extend in the front-rear direction on the vehicle body frame 1 and provided on the vehicle body frame 1 through a pin joint portion 5a such that a lower rear end portion thereof can be inclined, the pair of driven wheels (front wheels) 2L and 2R provided on the front right and left sides below the vehicle body frame 1, the pair of drive wheels (rear wheels) 3L and 3R provided on the rear right and left sides below a vehicle body, a cabin 4 provided on the front side above the vehicle body frame 1, a fuel tank 9 provided below the vehicle body frame 1, an engine 11 arranged on the vehicle body frame 1 and driven by fuel supplied from the fuel tank 9, and the electric drive system having a main engine power generator 12 (a first power generator) driven by the engine 11 connected thereto, the travel motors 10L and 10R driving the wheels (the drive wheels 3L and 3R) by means of power output from the main engine power generator 12, and the like. The travel motors 10L and 10R are, together with decelerators 3aL and 3aR, housed in a rotary shaft portion for the drive wheels 3L and 3R. The vehicle body frame 1 and the bed 5 are connected to each other through a hoist cylinder 6, and the bed 5 is turned about the pin joint portion 5a by extension/contraction of the hoist cylinder 6.

A deck on which an operator can walk is attached to the vehicle body frame 1, and the operator can move into the cabin 4 through the deck. An accelerator pedal, a brake pedal, a hoist pedal, a steering wheel, and the like, which are not shown, are placed inside the cabin 4. The operator controls acceleration force or braking force of the electrically-driven dump truck 100 according to the amount of stepping on the accelerator pedal or the brake pedal in the cabin 4, rotates the steering wheel right and left to perform steering operation by hydraulic drive, and steps on the hoist pedal to perform the operation of dumping the bed 5 by hydraulic drive.

A control cabinet 8 housing various types of electric equipment and a plurality of h7 for releasing surplus energy as heat are mounted at the rear of the cabin 4. Note that although not shown in FIG. 1, an accessory power generator 31 as a power source for accessories, a main pump (not shown) as a hydraulic source for hydraulic equipment, and the like are mounted on a portion of the vehicle body frame 1 between the right and left front wheels 2L and 2R in addition to the engine 11 and the main engine power generator 12.

In FIG. 2, the regenerative braking system of the electrically-driven dump truck 100 includes the main engine power generator 12 (the first power generator) and the accessory power generator 31 (a second power generator) connected to the engine 11, a rectification circuit 14 (a first rectification circuit) connected to the main engine power generator 12 and rectifying the output power of the main engine power generator 12 to output DC power to a main engine DC line 16 (a first DC line), travel motor inverters 13L and 13R connected to between the main engine DC line 16 and each of the travel motors 10L and 10R, a power consumption device 15 that can consume the power of the main engine DC line 16, a rectification circuit 32 (a second rectification circuit) connected to the accessory power generator 31 and rectifying the output power of the accessory power generator 31 to output DC power to an accessory DC line 34 (a second DC line), an accessory device 33 connected to the accessory DC line 34, a power regeneration device 21 converting the power of the main engine DC line 16 to supply the resultant power to the accessory DC line 34, and a controller 41 controlling the main engine power generator 12, the power consumption device 15, and the power regeneration device 21.

Note that in FIG. 2, control signals output from the controller 41 to the power regeneration device 21 are, for the sake of simplicity in illustration, collectively shown as one for a single signal line. However, as described later, these control signals include a plurality of signals such as control signals for each of power conversion modules 221 to 22N and each of bypass devices 231 to 23N and a control signal for a relay 25. Similarly, e.g., detection signals output from the power regeneration device 21 to the controller 41 are collectively shown as one for a single signal line. However, as described later, these detection signals include plural types of information such as a voltage or a current detected by each of the power conversion modules 221 to 22N of the power regeneration device 21, a physical quantity such as a temperature, and other state quantities.

The inverters 13L and 13R are configured using, e.g., IGBTs (Insulated Gate Bipolar Transistors) as switching elements.

The rectification circuit 14 rectifies the output power of the main engine power generator 12 to output DC power to the main engine DC line 16, and for example, is configured using a diode. Note that instead of the rectification circuit 14, a converter using a switching element may be used.

The power consumption device 15 consumes the power of the main engine DC line 16 on the basis of a command signal from the controller 41, and has a switching element 152 and a diode 153 connected in series between two positive and negative electrodes of the main engine DC line 16 to form a chopper and a resistor 151 connected in parallel with the switching element 152. The resistor 151 is mounted on a grid box 7. For example, an IGBT is used as the switching element 152.

Note that a case where the IGBTs are used as the switching elements used for the inverters 13L and 13R and the switching element 152 used for the power consumption device 15 has been described as an example, but the present invention is not limited to such a case. For example, a configuration using other types of switching elements such as MOSFETs (Metal-Oxide-Semiconductor Field Effect Transistors) may be employed.

A voltage sensor 17 detecting the voltage of the main engine DC line 16 is connected to the two positive and negative electrodes of the main engine DC line 16. A voltage value (a detection value) detected by the voltage sensor 17 is output to the controller 41.

The accessory device 33 is, for example, inverter and compressor motor systems for an air-conditioner and inverter and blower motor systems for equipment cooling. Note that in FIG. 2, these systems are taken as a single equivalent impedance, and are shown as the accessory device 33. Note that although not shown in FIG. 2, a battery, a capacitor, a voltage sensor, and the like are connected to the accessory DC line 34.

The power regeneration device 21 is connected to between a main engine system (the main engine DC line 16) and an accessory system (the accessory DC line 34), and converts the power (the voltage in this case) of the main engine DC line 16 to supply power to the accessory DC line 34. That is, the power regeneration device 21 converts voltage used in the main engine DC line 16 into voltage used in the accessory DC line 34, and outputs such voltage. The accessory device 33 is driven by power supplied from the accessory power generator 31 through the rectification circuit 32 and power supplied from the power regeneration device 21.

The power regeneration device 21 includes the plurality (e.g., N modules: N is a positive integer equal to or greater than two) of power conversion modules 221 to 22N, each of the power conversion modules 221 to 22N being connected in series between the two positive and negative electrodes of the main engine DC line 16 and between two positive and negative electrodes of the accessory DC line 34. The power conversion modules 221 to 22N are DC-DC conversion circuits, and convert input DC voltage to output DC voltage while obtaining insulation between an input and an output by a transformer. Note that although not shown in the figure, the power regeneration device 21 includes control components such as a breaker and a relay, protection components such as a fuse, voltage and current sensors, a noise filter, and the like.

Figure 3:
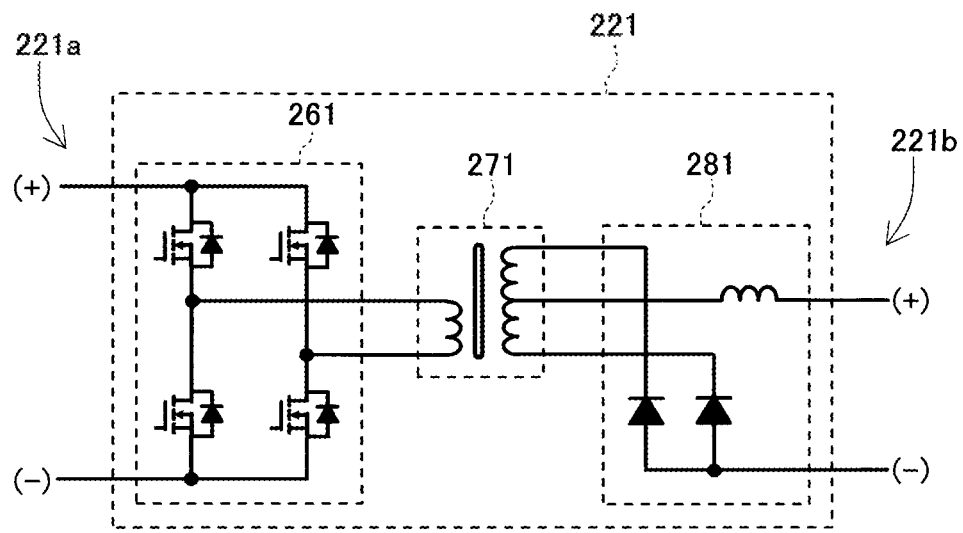
FIG. 3 is a diagram schematically showing one example of the configuration of a power conversion module.

FIG. 3 is a diagram schematically showing one example of the configuration of the power conversion module. In FIG. 3, the configuration of the power conversion module 221 of the plurality of power conversion modules 221 to 22N is shown as a representative, and the other power conversion modules 222 to 2N having similar configurations are not shown in the figure and will not be described.

In FIG. 3, the power conversion module 221 generally includes an inverter 261 connected to between a positive electrode terminal (+) and a negative electrode terminal (−) of an input section 221a, a rectification circuit 281 connected to between a positive electrode terminal (+) and a negative electrode terminal (−) of an output section 221b, and a transformer 271 connected to between the inverter 261 and the rectification circuit 281. Note that although not shown in the figure, the power conversion module 221 includes a protection component such as a fuse, a noise filter, voltage, current, and temperature sensors, smoothing capacitors connected to between input terminals of the input section 221a and between output terminals, and the like.

The inverter 261 converts DC voltage input to the input section 221a of the power conversion module 221 into AC voltage, and applies the AC voltage to a primary winding of the transformer 271. The inverter 261 is, for example, a full-bridge inverter circuit including four switching elements. An output terminal of the inverter 261 is connected to the primary winding of the transformer 271. A secondary winding of the transformer 271 is connected to an input terminal of the rectification circuit 281. Note that a case where MOSFETs are used for the inverter 261 has been described as an example, but the present invention is not limited to such a case. A configuration using other types of switching elements such as IGBTs may be employed. As long as a similar function can be fulfilled, other circuit types may be used as the inverter 261.

The transformer 271 transforms AC voltage output from the inverter 261 to output such voltage to the rectification circuit 281 while obtaining insulation between the inverter 261 and the rectification circuit 281. The transformer 271 is, for example, of a center tap type including a single input-side primary winding and two output-side secondary windings. Note that as long as a similar function can be fulfilled by the transformer 271, other circuit types may be used as the transformer 271. For example, depending on the configuration of the rectification circuit 281, a configuration including a single secondary winding can be utilized as the transformer 271.

The rectification circuit 281 rectifies AC voltage transformed and output by the transformer 271 into DC voltage to output the DC voltage to the output section 221b of the power conversion module 221. The rectification circuit 281 includes, for example, two diodes and a choke coil.

The power conversion module 221 controls, while obtaining insulation between the input and the output (the input section 221a and the output section 221b) of the power conversion module 221 with the above-described configuration, operation of the inverter 261 on the basis of the command signal from the controller 41 to thereby (variably) control output voltage.

The voltage of the main engine DC line 16, i.e., the input voltage to the power regeneration device 21, is defined as Vi. The input sections 221a to 221Na of the power conversion modules 221 to 22N are connected in series, and thus the input voltage Vi is distributed to each of the power conversion modules 221 to 22N. Considering balance among the input voltages Vi to the power conversion modules 221 to 22N, the input voltage to each of the power conversion modules 221 to 22N is Vi/N. That is, even when a high voltage (e.g., a voltage exceeding the upper limit of the input voltage to each of the power conversion modules 221 to 22N) is input to the power regeneration device 21, a low-withstand-voltage component whose input voltage upper limit is higher than Vi/N can be used as each of the power conversion modules 221 to 22N. Note that when the output sections 221b to 22Nb of the power conversion modules 221 to 22N are connected in series as shown in FIG. 2, the sum of the output voltages of the power conversion modules 221 to 22N is the output voltage of the power regeneration device 21.

As shown in FIG. 2, the bypass devices 231 to 23N (a first bypass device group) are connected to the input sections 221a to 22Na of the power conversion modules 221 to 22N, respectively. Each of the bypass devices 231 to 23N short-circuits a portion between input terminals (i.e., two positive and negative electrodes) of corresponding one of the power conversion modules 221 to 22N on the basis of the control signal from the controller 41. That is, the bypass devices 231 to 23N switches between short-circuit (ON) and open (OFF). Similarly, bypass devices 241 to 24N (a second bypass device group) are connected to the output sections 221b to 22Nb of the power conversion modules 221 to 22N, respectively. For example, switching elements or relays are conceivable as the bypass devices 231 to 23N, 241 to 24N.

Figure 4:
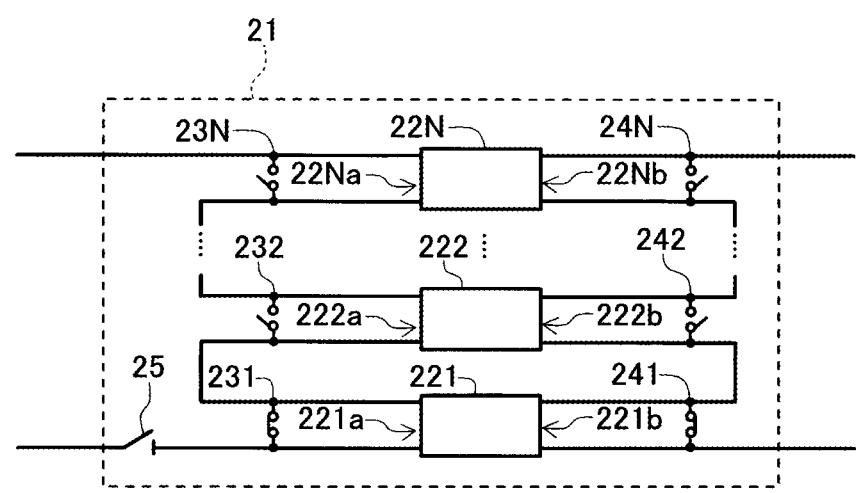
FIG. 4 is a diagram showing one example of operation of a bypass device.

FIG. 4 is a diagram showing one example of operation of the bypass device.

FIG. 4 shows an example where the bypass devices 231 and 241 of the power conversion module 221 are turned on and a portion between the positive and negative electrode terminals of the input section 221a and a portion between the positive and negative electrode terminals of the output section 221b are short-circuited. In this case, the input voltage to and the output voltage from the power conversion module 221 are zero. Accordingly, an optional one of the power conversion modules 221 to 22N can be separately electrically detached from series connection. Current from the power conversion module 222 bypasses the power conversion module 221, and is supplied to each the main engine DC line 16 and the accessory DC line 34.

The relay 25 as a control component is provided on the input side of the power regeneration device 21. The relay 25 is further connected in series with the input sections 221a to the 22Na of the power conversion modules 221 to 22N connected in series to form the power regeneration device 21, and can cut off power supplied to the power regeneration device 21 by open operation. That is, the relay 25 switches, on the basis of the control signal from the controller 41, between power supply (conduction) from the main engine DC line 16 to the power regeneration device 21 and power cutoff.

The controller 41 controls, on the basis of the state of the dump truck and operator's operation input, the engine 11, the travel motor inverters 13L and 13R, the chopper (the switching element 152 and the diode 153) in the power consumption device 15, and the accessory device 33, thereby controlling the flow of energy in the system.

Figure 5:
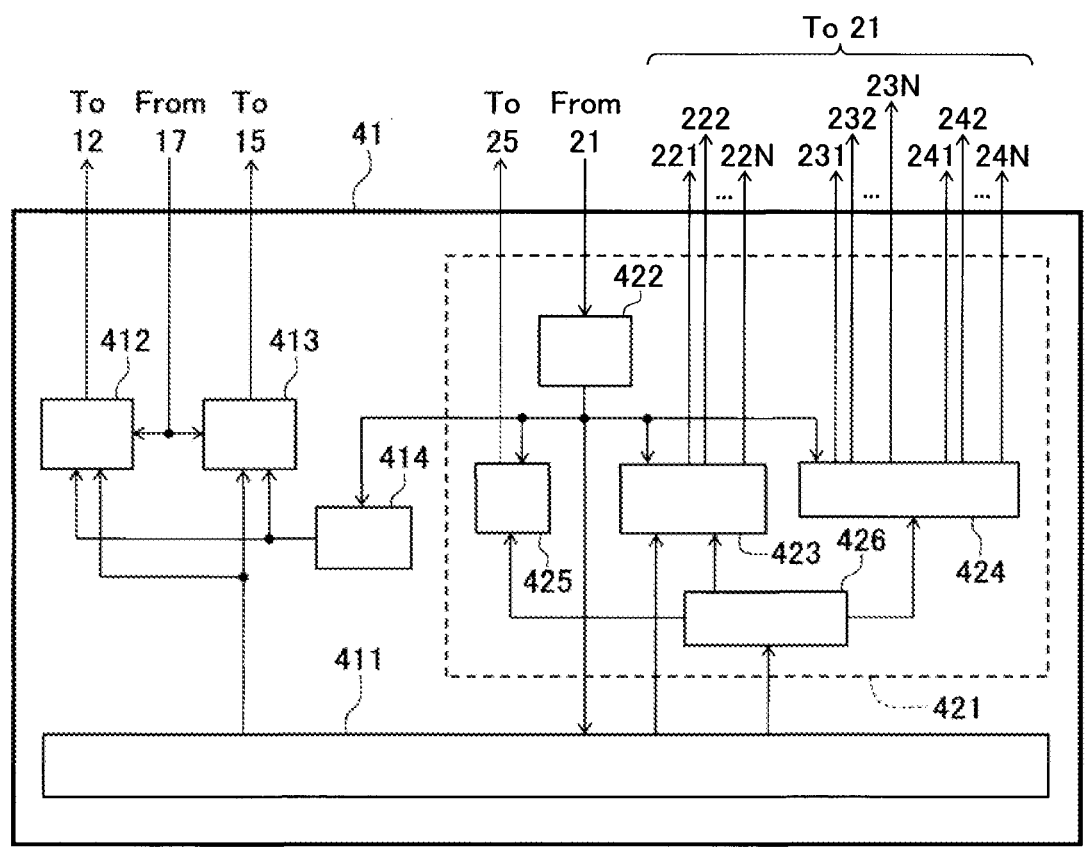
FIG. 5 is a functional block diagram schematically showing processing functions of a controller according to the first embodiment.

FIG. 5 is a functional block diagram schematically showing processing functions of the controller.

In FIG. 5, the controller 41 includes a system control section 411, a power generator control section 412, a power consumption device control section 413, a voltage upper limit value setting section 414, and a power regeneration control section 421. Moreover, the power regeneration control section 421 includes a failure detection section 422, a module control section 423, a bypass control section 424, a relay control section 425, and a timing control section 426.

The system control section 411 controls the entirety of the controller 41, and sets and outputs a voltage set value used in the power generator control section 412 and the power consumption device control section 413 on the basis of the state of the dump truck and operation of the operator. Further, the system control section 411 outputs the control signals to the module control section 423 and the timing control section 426 of the power regeneration control section 421 on the basis of the state of the electrically-driven dump truck 100, operation by the operator, and failure detection signals (described later) regarding the power regeneration device 21 from the failure detection section 422. The control signal output to the module control section 423 is an output set value for the power regeneration device 21. Moreover, the control signal output to the timing control section 426 is an ON/OFF timing signal for controlling the timing of switching the power conversion modules 221 to 22N of the power regeneration device 21 between operation (ON) and stop (OFF) and switching the relay 25 between conduction (ON) and cutoff (OFF).

The failure detection section 422 of the power regeneration control section 421 outputs the failure detection signals to the system control section 411, the voltage upper limit value setting section 414, the module control section 423, the bypass control section 424, and the relay control section 425 on the basis of the detection signals from the power regeneration device 21. The detection signal input from the power regeneration device 21 to the failure detection section 422 includes plural types of information such as the voltage and the current detected by each of the power conversion modules 221 to 22N of the power regeneration device 21, the physical quantity such as the temperature, and the other state quantities. On the basis of these types of information, the failure detection section 422 specifies the presence or absence of failure such as occurrence of overcurrent and the power conversion module in which failure has occurred, for example. The failure detection signals output from the failure detection section 422 include information for identifying a failed module from among the plurality of modules. Specific operation of the failure detection section 422 will be described below in detail. As already described, each of the power conversion modules 221 to 22N includes the voltage sensor, the current sensor, and the temperature sensor. Here, the voltage detection section for measuring the input voltage to each power conversion module is mounted. The power regeneration device 21 outputs to the failure detection section 422, as the detection signal, a detection value (an analog signal) of the input voltage to each power conversion module. The failure detection section 422 determines, if the input voltage to the power conversion module 221 is higher than a predetermined threshold, that overvoltage failure has occurred in the power conversion module 221. Moreover, the voltage sensor of each power conversion module includes the function of comparing the input voltage with the predetermined threshold to determine the presence or absence of the overvoltage failure. In this case, the power regeneration device 21 outputs a state signal (a digital signal) corresponding to the presence or absence of the overvoltage failure in each power conversion module to the failure detection section 422 with the state signal being superimposed on the input voltage detection signal. In this case, the failure detection section 422 separates and extracts the state signal as the digital signal from the detection signal, and thus the presence or absence of the overvoltage failure in each power conversion module can be directly determined.

The timing control section 426 of the power regeneration control section 421 separately outputs, on the basis of the ON/OFF timing signal output from the system control section 411, ON/OFF timing signals to the module control section 423, the bypass control section 424, and the relay control section 425. With this configuration, the timing of ON/OFF of each module, each bypass device, and the relay 25 can be controlled.

The module control section 423 of the power regeneration control section 421 outputs, on the basis of the output set value output from the system control section 411, the control signal to each of the power conversion modules 221 to 22N of the power regeneration device 21 such that the output power of the power regeneration device 21 is coincident with the output set value. In a period in which the timing control section 426 outputs OFF as the ON/OFF timing signal, the control signals are output such that all modules are stopped. The module control section 423 specifies the failed module according to the failure detection signal output from the failure detection section 422, and outputs the control signals such that only healthy modules are operated in step number reduction operation.

The bypass control section 424 of the power regeneration control section 421 controls, on the basis of the ON/OFF timing signal output from the timing control section 426, ON/OFF of each of the bypass devices 231 to 23N and 241 to 24N of the power regeneration device 21. The bypass control section 424 specifies the failed power conversion module according to the failure detection signal from the failure detection section 422, and outputs the control signal such that the bypass device of the failed module is turned on at timing specified by the ON/OFF timing signal.

The relay control section 425 of the power regeneration control section 421 controls ON/OFF of the relay 25 on the basis of the ON/OFF timing signal output from the timing control section 426.

The voltage upper limit value setting section 414 sets a voltage upper limit value (hereinafter defined as a voltage upper limit value Vm) as a variable upper limit value on the basis of the failure detection signal from the failure detection section 422, and outputs the voltage upper limit value Vm to the power generator control section 412 and the power consumption device control section 413. The voltage upper limit value Vm is an upper limit value of the voltage (i.e., the input voltage Vi to the power regeneration device 21) of the main engine DC line 16.

The power generator control section 412 and the power consumption device control section 413 output the control signals for controlling the main engine power generator 12 and the power consumption device 15 on the basis of the detection value (the voltage detection value) of the voltage (i.e., the input voltage Vi to the power regeneration device 21) of the main engine DC line 16 detected by the voltage sensor 17, the voltage set value output from the system control section 411, and the voltage upper limit value Vm output from the voltage upper limit value setting section 414, thereby controlling the main engine power generator 12 and the power consumption device 15 to control the input voltage Vi to the power regeneration device 21. More specifically, the power generator control section 412 and the power consumption device control section 413 control the main engine power generator 12 and the power consumption device 15 such that the input voltage Vi is coincident with the voltage set value and does not exceed the voltage upper limit value Vm.

In the regenerative braking system of the present embodiment configured as described above, the step number reduction operation of stopping operation of the power conversion module (e.g., the power conversion module 221) detected as failed by the failure detection section 422 and operating only the healthy power conversion modules (e.g., the power conversion modules 222 to 22N) is performed. In the step number reduction operation, when some (e.g., the power conversion module 221) of the plurality of power conversion modules 221 to 22N are stopped, the portion between the positive and negative electrode terminals of the input section 221a of the power conversion module 221 to be stopped is short-circuited by the bypass device 231, and the voltage upper limit value Vm as the variable upper limit value is decreased.

Hereinafter, the contents of the processing by the regenerative braking system including the step number reduction operation will be described in detail.

Figure 6:
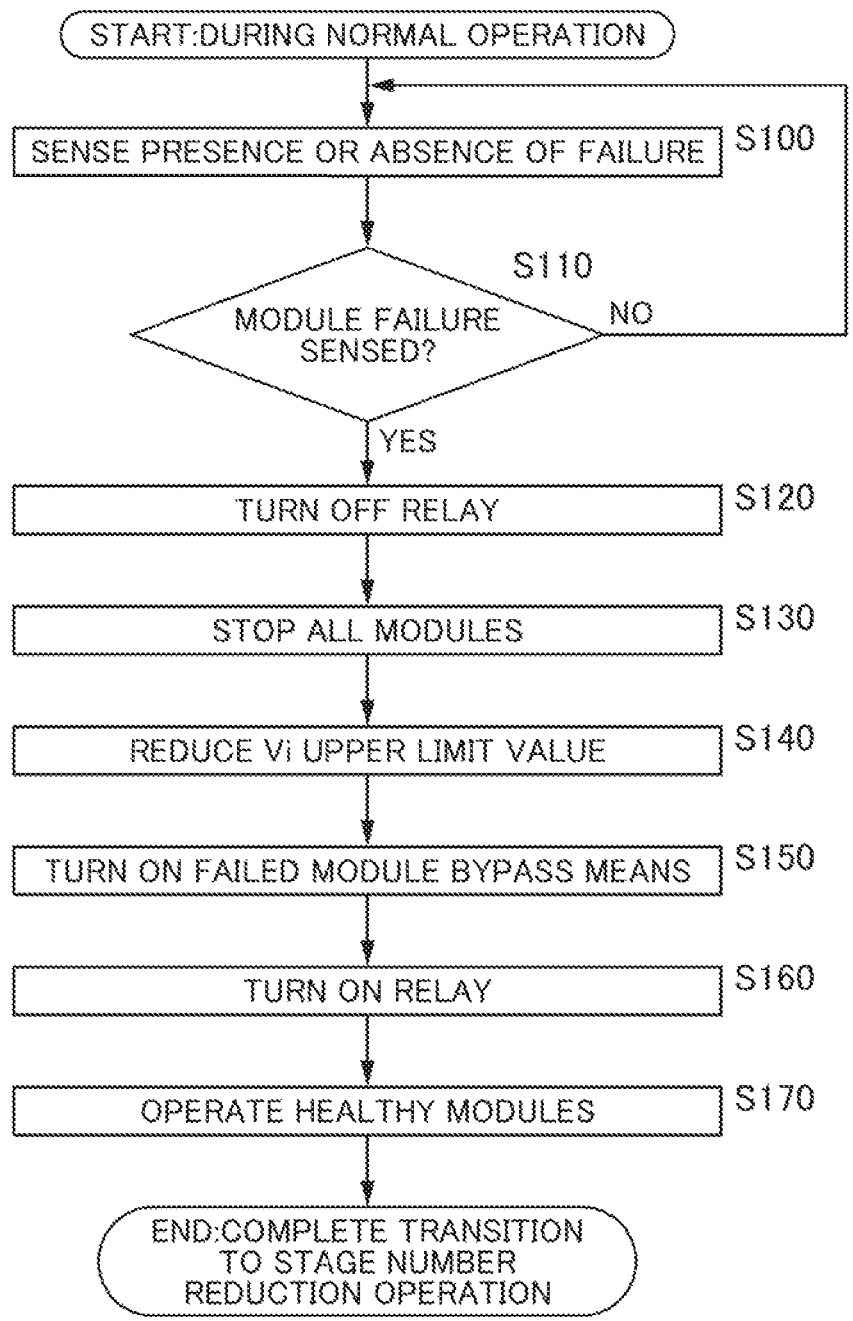
FIG. 6 is a flowchart showing the contents of the processing in the regenerative braking system according to the first embodiment.

FIG. 6 is a flowchart showing the contents of the processing in the regenerative braking system. Moreover, FIG. 7 is a graph showing a temporal change in the voltage upper limit value and the input voltage and the ON/OFF states of the relay, the bypass device of the power conversion module detected as failed, and the power regeneration device in the processing by the regenerative braking system.

In FIG. 6, the controller 41 first performs, during normal operation in which the step number reduction operation is not performed, detection of the failed power conversion module by the failure detection section 422 of the power regeneration control section 421 (step S100). The system control section 411 determines, on the basis of the failure detection signals from the failure detection section 422, whether or not there is the failed power conversion module (step S110). When a determination result at the step S110 is NO, i.e., there is no failed power conversion module, the processing of the steps S100 and S110 is repeated until a determination result of YES is obtained while the normal operation is being continuously performed. Note that the normal operation indicates an operation state in which all of the N power conversion modules 221 to 22N of the power regeneration device 21 are operated.

Figure 7:
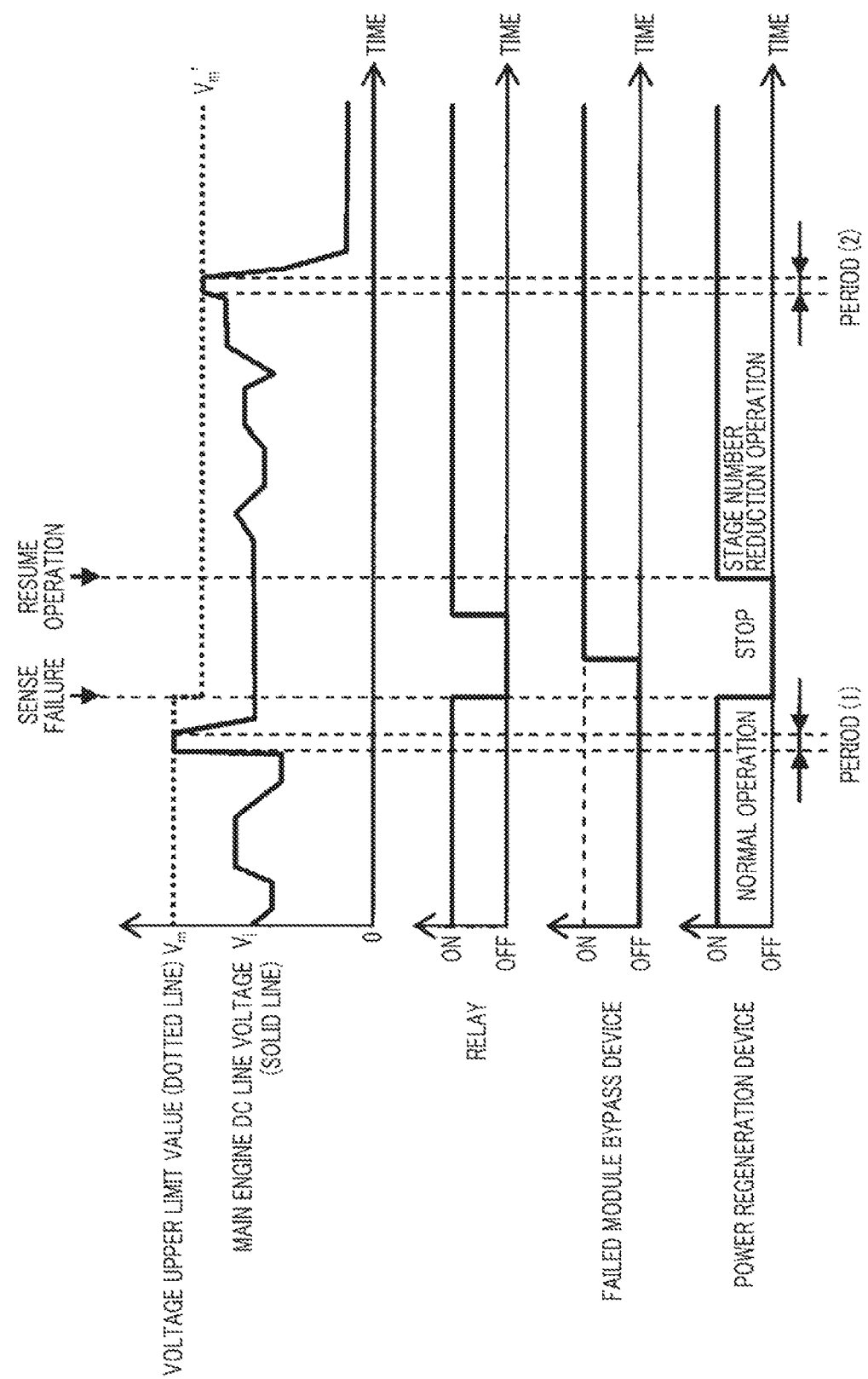
FIG. 7 is a graph showing a temporal change in a voltage upper limit value and an input voltage and ON/OFF states of a relay, the bypass device of the power conversion module detected as failed, and a power regeneration device in the processing by the regenerative braking system according to the first embodiment.

As shown in FIG. 7, the system control section 411 controls, in the normal operation, the relay control section 425 to control the relay 25 to the conduction (ON), and controls the module control section 423 to control the power regeneration device 21 (in this case, the power conversion modules 221 to 22N) to the operation (ON). Note that there is no power conversion module detected as failed, and therefore, there is no bypass device controlled to the short-circuit (ON) by the bypass control section 424. The system control section 411 controls the power generator control section 412 and the power consumption device control section 413 to control the main engine power generator 12 and the power consumption device 15 such that the input voltage Vi is coincident with the voltage set value and does not exceed the voltage upper limit value Vm (see a period (1)).

Further, when the determination result at the step S110 is YES, i.e., the failure detection signals from the failure detection section 422 include the information on the power conversion module detected as failed (hereinafter, a case where failure of the power conversion module 221 has been detected will be described as an example), the system control section 411 controls the relay control section 425 to control the relay 25 to the cutoff (OFF) (step S120), and controls the module control section 423 to control all of the power conversion modules 221 to 22N of the power regeneration device 21 to the stop (OFF) (step S130). Furthermore, the voltage upper limit value setting section 414 decreases the voltage upper limit value Vm to newly set a voltage upper limit value Vm2 and output the voltage upper limit value Vm2 to the power generator control section 412 and the power consumption device control section 413 (step S140). The processing of the steps S120 to S140 corresponds to failure detection timing of FIG. 7. Note that various methods are conceivable for determining the decreased voltage upper limit value Vm2, but are for making determination such that at least Vm>Vm2 is satisfied. For example, when some (the power conversion module 221) of the power conversion modules 221 to 22N are stopped, the voltage upper limit value Vm2 may be determined such that the voltage upper limit value corresponding to one of the unstopped healthy power conversion modules 222 to 22N is not changed. More specifically, when one (e.g., the power conversion module 221) of the N power conversion modules 221 to 22N is stopped, the decreased voltage upper limit value Vm2 is set such that Vm/N=Vm2/(N−1) is satisfied.

Subsequently, the system control section 411 controls the bypass control section 424 to control the bypass devices 231 and 241 of the power conversion module 221 detected as failed to the short-circuit (ON) (step S150). The processing of the step S150 corresponds to the timing of failure detection to operation resumption in FIG. 7.

Subsequently, the system control section 411 controls the relay control section 425 to control the relay 25 to the conduction (ON) (step S160), and controls the module control section 423 to control the healthy power conversion modules 222 to 22N to the operation (ON) (step S170). Then, transition to the step number reduction operation is completed. The processing of the steps S160 and S170 corresponds to the operation resumption timing of FIG. 7.

In the step number reduction operation, the main engine power generator 12 and the power consumption device 15 are controlled such that the input voltage Vi is coincident with the voltage set value and does not exceed the decreased voltage upper limit value Vm2 as shown in FIG. 7 (see a period (2)).

Features and advantageous effects of the present embodiment configured as described above will be described.

As the prior art, a single-phase inverter as a power conversion device is taken as a module, and a plurality of modules are connected in series to form a single power conversion device. In the prior art as described above, when failure has occurred or the need has arisen to perform maintenance, a portion between output terminals is brought into a bypass (short-circuit) state by a switch as bypass means connected to an output of each module, and in this manner, some modules are stopped and operation can be continued by the remaining modules. Moreover, auxiliary modules are provided, and when some modules are stopped, operation is continued using the auxiliary modules without the need for decreasing an output voltage.

However, in the prior art described above, the auxiliary modules need to be provided, and for this reason, there is a problem that the entirety of a power regeneration device is increased in size by an amount corresponding to these auxiliary modules. The bypass means (the switch) of each module may be short-circuited to stop some modules, and operation may be continued by the remaining modules. However, in this case, a voltage to be applied to the remaining modules increases. For this reason, the withstand voltage of each module component needs to be increased in advance and an insulation distance in each module needs to be ensured so that each module can withstand the increased voltage. Thus, in this case, there is also a problem that the module is increased in size, i.e., the entirety of the power regeneration device is increased in size.

In contrast, in the present embodiment, in the regenerative braking system including: the main engine power generator 12 (the first power generator) and the accessory power generator 31 (the second power generator) connected to the engine 11; the rectification circuit 14 (the first rectification circuit) connected to the main engine power generator 12 and rectifying the output power of the main engine power generator 12 to output the DC power to the main engine DC line 16 (the first DC line); the travel motor inverters 13L and 13R connected to between the main engine DC line 16 and each of the travel motors 10L and 10R; the power consumption device 15 that can consume the power of the main engine DC line 16; the rectification circuit 32 (the second rectification circuit) connected to the accessory power generator 31 and rectifying the output power of the accessory power generator 31 to output the DC power to the accessory DC line 34 (the second DC line); the accessory device 33 connected to the accessory DC line 34; the power regeneration device 21 converting the power of the main engine DC line 16 to supply the resultant power to the accessory DC line 34; and the controller 41 controlling the main engine power generator 12, the power consumption device 15, and the power regeneration device 21, the power regeneration device includes the plurality of power conversion modules 221 to 22N configured such that the input sections 221a to 22Na to which the power from the main engine DC line 16 is input are connected in series and the bypass devices 231 to 23N connected to the input sections 221a to 22Na of the plurality of power conversion modules 221 to 22N, respectively, so that the portion between the positive electrode terminal (+) and the negative electrode terminal (−) of each of the input sections 221a to 22Na can be short-circuited. Further, the controller 41 controls the main engine power generator 12, the power consumption device 15, and the power regeneration device 21 such that the voltage input from the main engine DC line 16 to the power regeneration device 21 does not exceed the voltage upper limit value Vm. Furthermore, when some of the plurality of power conversion modules 221 to 22N are stopped, the portion between the positive electrode terminal (+) and the negative electrode terminal (−) of the input section of the power conversion module to be stopped is short-circuited by the bypass device, and the voltage upper limit value Vm is decreased. With this configuration, operational continuity can be improved while a device size increase is prevented.

For example, assuming the case of the same input voltage Vi, the input voltage to each of the power conversion modules 221 to 22N is higher in the step number reduction operation than in the normal operation. That is, the withstand voltage of each of the power conversion modules 221 to 22N needs to be increased considering the step number reduction operation, and this leads to an increase in the size of the power regeneration device 21.

In contrast, in the present embodiment, the voltage upper limit value Vm as the upper limit value of the input voltage Vi is decreased to Vm2 in the step number reduction operation, and accordingly, the main engine power generator 12 and the power consumption device 15 are controlled. That is, control is performed such that the maximum value of the input voltage to each of the power conversion modules 221 to 22N does not increase or the amount of increase is smaller in the step number reduction operation than in the normal operation. Thus, the withstand voltage of each of the power conversion modules 221 to 22N does not need to be increased. Consequently, the step number reduction operation can be performed by the compact lightweight power conversion modules 221 to 22N, and therefore, can be performed by the compact lightweight power regeneration device 21.

Particularly, the ON resistance of each switching element forming the power conversion modules 221 to 22N decreases and these switching elements can perform operation at a higher speed as the withstand voltage decreases. Thus, a power loss can be further reduced. Operation is performed at the higher speed, and thus the operation frequency of the transformer 271 can be increased and the transformer 271 can be decreased in size and weight. The transformer 271 makes up a significant proportion of the power regeneration device 21 in terms of dimensions/ weight, and therefore, size and weight reduction in the transformer 271 leads to size and weight reduction in the entirety of the power regeneration device 21. That is, with such a configuration that the plurality of power conversion modules 221 to 22N are connected in series as in the present embodiment, a compact, lightweight, and power-saving power regeneration device with high operational continuity can be achieved.

In the present embodiment described above, energy saving of the electrically-driven work vehicle can be achieved by the regenerative braking system using the power regeneration device 21 configured such that the plurality of power conversion modules 221 to 22N are connected in series. In addition, when some power conversion modules are stopped due to a reason such as failure, operation is continued by the remaining power conversion modules, and therefore, the operational continuity can be improved while the device size increase is prevented.

Note that in the present embodiment, the case where the switch-like bypass devices 241 to 24N capable of switching the portion between the positive and negative electrode terminals of each of the output sections 221b to 22Nb of the power conversion modules 221 to 22N between the short-circuit and the open are used has been described as an example. However, instead of the bypass devices 241 to 24N, a diode whose cathode terminal is connected to the positive electrode (+) terminal of each of the output sections 221b to 22Nb of the power conversion modules 221 to 22N and whose anode terminal is connected to the negative electrode (−) terminal of each of the output sections 221b to 22Nb of the power conversion modules 221 to 22N may be used as the bypass device. Alternatively, it may be configured such that no bypass devices 241 to 24N are connected to the output sections 221b to 22Nb of the power conversion modules 221 to 22N. For example, in such a configuration, when the switching element of the inverter 261 of the power conversion module 221 shown as an example in FIG. 3 is failed and there is no abnormality in the rectification circuit 281, the diode of the rectification circuit 281 is brought into conduction to fulfill the function of the bypass device.

<Modification of First Embodiment>

A modification of the first embodiment will be described with reference to FIG. 8. In the present modification, only differences from the first embodiment will be described. The same reference numerals are used to represent members similar to those of the first embodiment in the figures, and description thereof will be omitted.

In the present modification, the output sections 221b to 22Nb of the power conversion modules 221 to 22N in the power regeneration device 21 of the first embodiment are connected in parallel, considering that the voltage of the accessory DC line 34 becomes sufficiently lower than the voltage of the main engine DC line 16.

Figure 8:
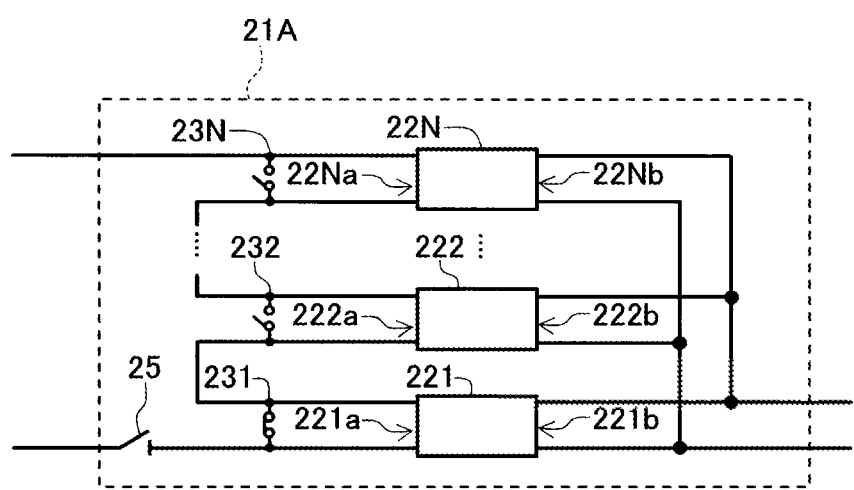
FIG. 8 is a diagram showing one example of a bypass device according to a modification of the first embodiment.

FIG. 8 is a diagram showing one example of the bypass device according to the present modification.

In FIG. 8, a power regeneration device 21A includes the plurality (e.g., N modules: N is a positive integer equal to or greater than two) of power conversion modules 221 to 22N whose input sections 221a to 22Na are connected in series between the two positive and negative electrodes of the main engine DC line 16 and whose output sections 221b to 22Nb are connected in parallel between the two positive and negative electrodes of the accessory DC line 34.

FIG. 8 shows, as an example, a state in which the bypass device 231 of the power conversion module 221 is turned on to short-circuit the portion between the positive electrode terminal (+) and the negative electrode terminal (−) of the input section 221a. In this case, the voltage input to the power conversion module 221 is zero. Accordingly, an optional one of the power conversion modules 221 to 22N can be separately electrically detached from series connection. Further, current from the power conversion module 222 bypasses the power conversion module 221, and is supplied to the main engine DC line 16.

When the output sections 221b to 22Nb of the power conversion modules 221 to 22N are connected in parallel as in the present modification, the bypass devices of the output sections 221b to 22Nb are no longer necessary. The output voltage is common among the power conversion modules 221 to 22N, and does not change between the normal operation and the step number reduction operation. Thus, the control of increasing the output voltage in the step number reduction operation is no longer necessary, either. Note that the sum of the output currents of the power conversion modules 221 to 22N is the output current of the power regeneration device 21.

Other configurations are similar to those of the first embodiment.

In the present modification configured as described above, advantageous effects similar to those of the first embodiment can be achieved.

Moreover, the components such as the bypass device of the output section can be reduced.

Second Embodiment

A second embodiment will be described with reference to FIGS. 9 to 13. In the present embodiment, only differences from the first embodiment will be described. The same reference numerals are used to represent members similar to those of the first embodiment in the figures, and description thereof will be omitted.

An overvoltage protection threshold Vp as a variable upper limit value is used instead of the voltage upper limit value Vm in the first embodiment, and by stopping a power regeneration device 21 when the input voltage Vi to the power regeneration device 21 is higher than the overvoltage protection threshold Vp, control is performed such that a voltage input to the power regeneration device 21 does not exceed the variable upper limit value (the overvoltage protection threshold Vp).

Figure 9:
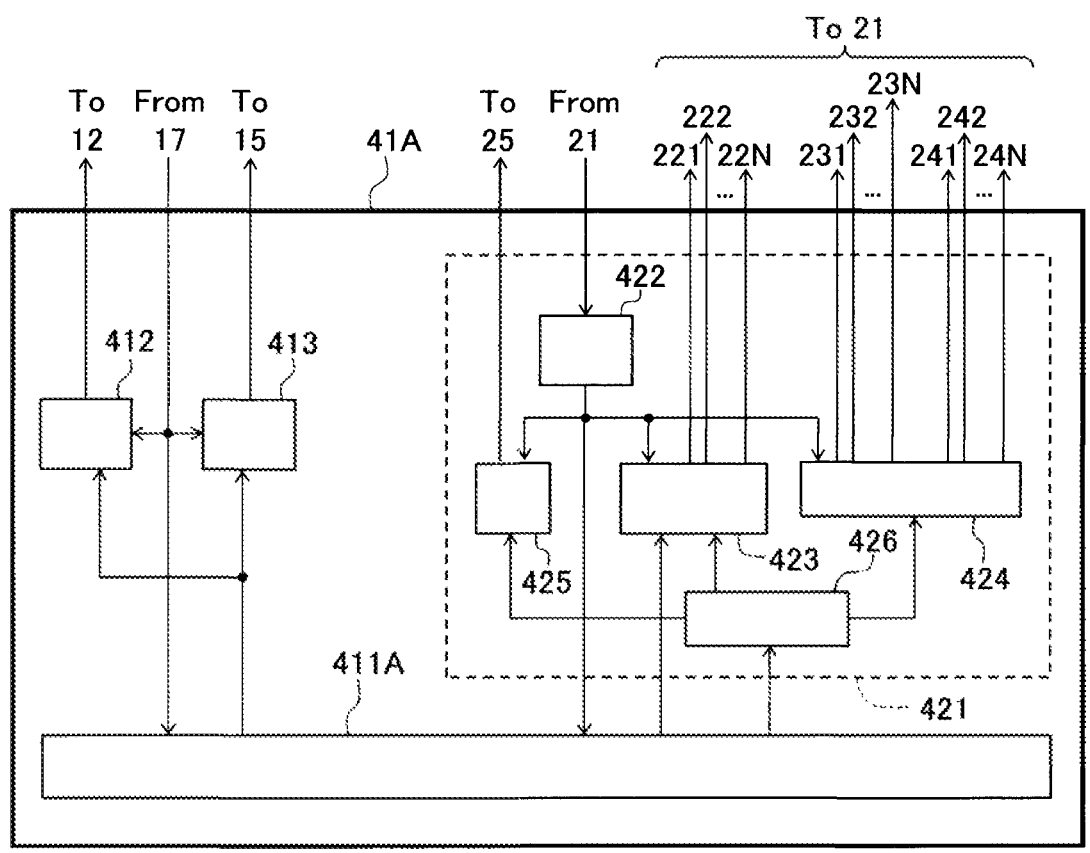
FIG. 9 is a functional block diagram schematically showing processing functions of a controller according to a second embodiment.

FIG. 9 is a functional block diagram schematically showing processing functions of a controller according to the present embodiment.

In FIG. 9, a controller 41A includes a system control section 411A, a power generator control section 412, a power consumption device control section 413, and a power regeneration control section 421. Moreover, the power regeneration control section 421 includes a failure detection section 422, a module control section 423, a bypass control section 424, a relay control section 425, and a timing control section 426.

The system control section 411A controls the entirety of the controller 41A, and on the basis of the state of a dump truck and operation by an operator, sets and outputs a voltage set value used in the power generator control section 412 and the power consumption device control section 413. The system control section 411 outputs, on the basis of the state of the electrically-driven dump truck 100, operation by the operator, and failure detection signals (described later) regarding the power regeneration device 21 from the failure detection section 422, control signals to the module control section 423 and the timing control section 426 of the power regeneration control section 421. The control signal output to the module control section 423 is an output set value for the power regeneration device 21. Moreover, the control signal output to the timing control section 426 is an ON/OFF timing signal for controlling the timing of switching power conversion modules 221 to 22N of the power regeneration device 21 between operation (ON) and stop (OFF) and switching a relay 25 between conduction (ON) and cutoff (OFF).

Moreover, the system control section 411A sets the overvoltage protection threshold (hereinafter defined as a voltage upper limit value Vp) as the variable upper limit value on the basis of a detection value (a voltage detection value) of the voltage (i.e., the input voltage Vi to the power regeneration device 21) of a main engine DC line 16 detected by a voltage sensor 17 and the failure detection signals from the failure detection section 422. The overvoltage protection threshold Vp is a threshold for determining whether or not the control for protecting input sections of the power regeneration device 21 is to be performed with respect to the voltage of the main engine DC line 16. The system control section 411A controls, when the input voltage Vi to the power regeneration device 21 is higher than the overvoltage protection threshold Vp, the module control section 423 to stop the power regeneration device 21 (more specifically, inverters 261 to 26N of the power conversion modules 221 to 22N), thereby performing control such that the voltage input to the power regeneration device 21 does not exceed the variable upper limit value (the overvoltage protection threshold Vp).

The power generator control section 412 and the power consumption device control section 413 output, on the basis of the detection value (the voltage detection value) of the voltage (i.e., the input voltage Vi to the power regeneration device 21) of the main engine DC line 16 detected by the voltage sensor 17 and the voltage set value output from the system control section 411A, control signals for controlling a main engine power generator 12 and a power consumption device 15 to the main engine power generator 12 and the power consumption device 15, thereby controlling the main engine power generator 12 and the power consumption device 15 to control the input voltage Vi to the power regeneration device 21. More specifically, the power generator control section 412 and the power consumption device control section 413 control the main engine power generator 12 and the power consumption device 15 such that the input voltage Vi is coincident with the voltage set value.

In a regenerative braking system of the present embodiment configured as described above, the step number reduction operation of stopping operation of the power conversion module (e.g., the power conversion module 221) detected as failed by the failure detection section 422 and operating only the healthy power conversion modules (e.g., the power conversion modules 222 to 22N) is performed. In the step number reduction operation, when some (e.g., the power conversion module 221) of the plurality of power conversion modules 221 to 22N are stopped, a portion between positive and negative electrode terminals of an input section 221a of the power conversion module 221 to be stopped is short-circuited by a bypass device 231, and the overvoltage protection threshold Vp as the variable upper limit value is decreased.

Hereinafter, the contents of the processing including the step number reduction operation in the regenerative braking system will be described in detail.

Figure 10:
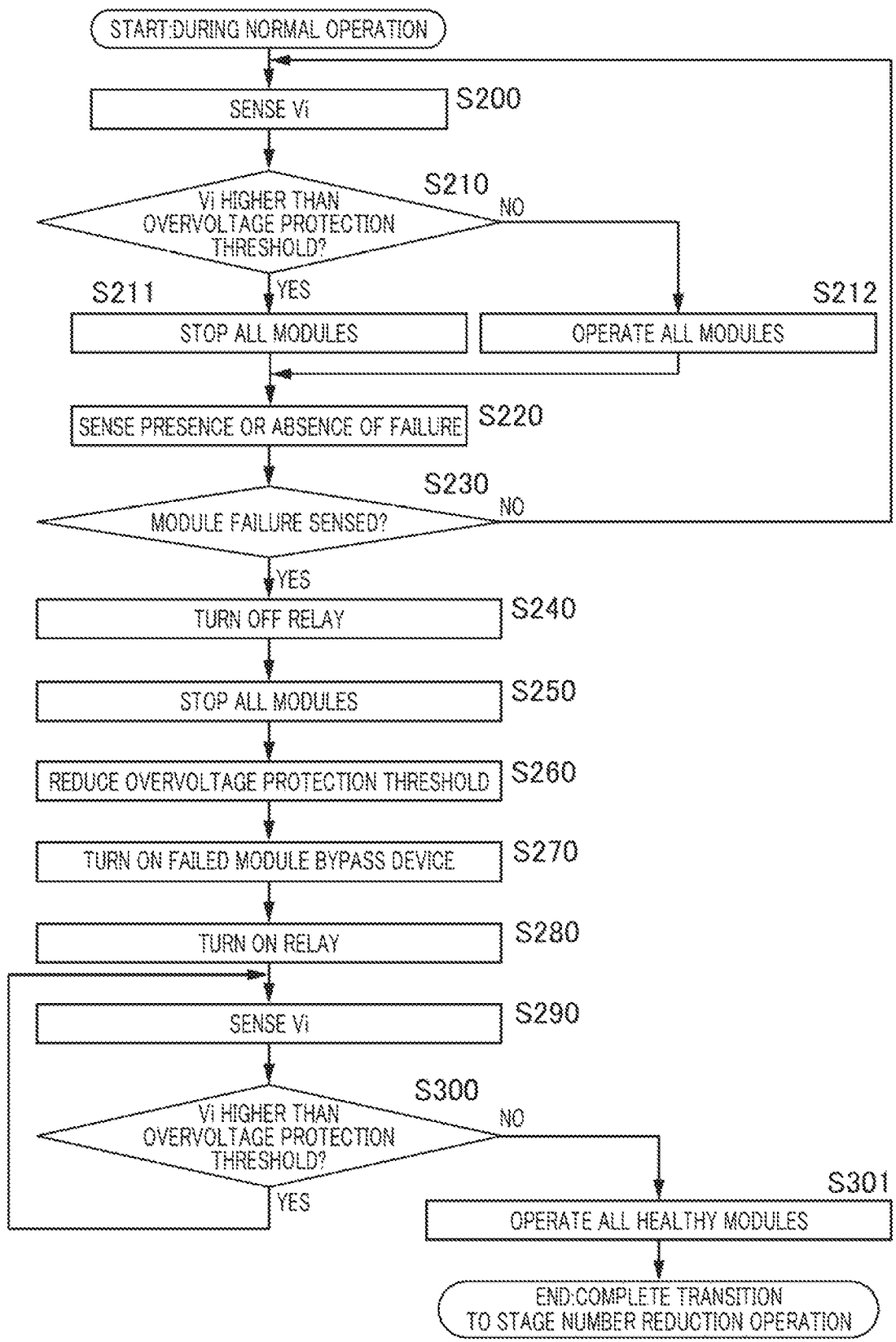
FIG. 10 is a flowchart showing the contents of the processing in a regenerative braking system according to the second embodiment.

FIG. 10 is a flowchart showing the contents of the processing in the regenerative braking system. Moreover, FIG. 11 is a graph showing a temporal change in the overvoltage protection threshold and the input voltage and the ON/OFF states of the relay, the bypass device of the power conversion module detected as failed, and the power regeneration device in the processing by the regenerative braking system.

In FIG. 10, the controller 41A first acquires, during normal operation in which the step number reduction operation is not performed, the input voltage Vi detected by the voltage sensor 17 (step S200), and determines whether or not the input voltage Vi is higher than the overvoltage protection threshold Vp (step S210). When a detection result at the step S210 is NO, all of the power conversion modules 221 to 22N of the power regeneration device 21 are operated (step S212). When the determination result at the step S210 is YES, all of the power conversion modules 221 to 22N of the power regeneration device 21 are stopped (step S211).

Figure 11:
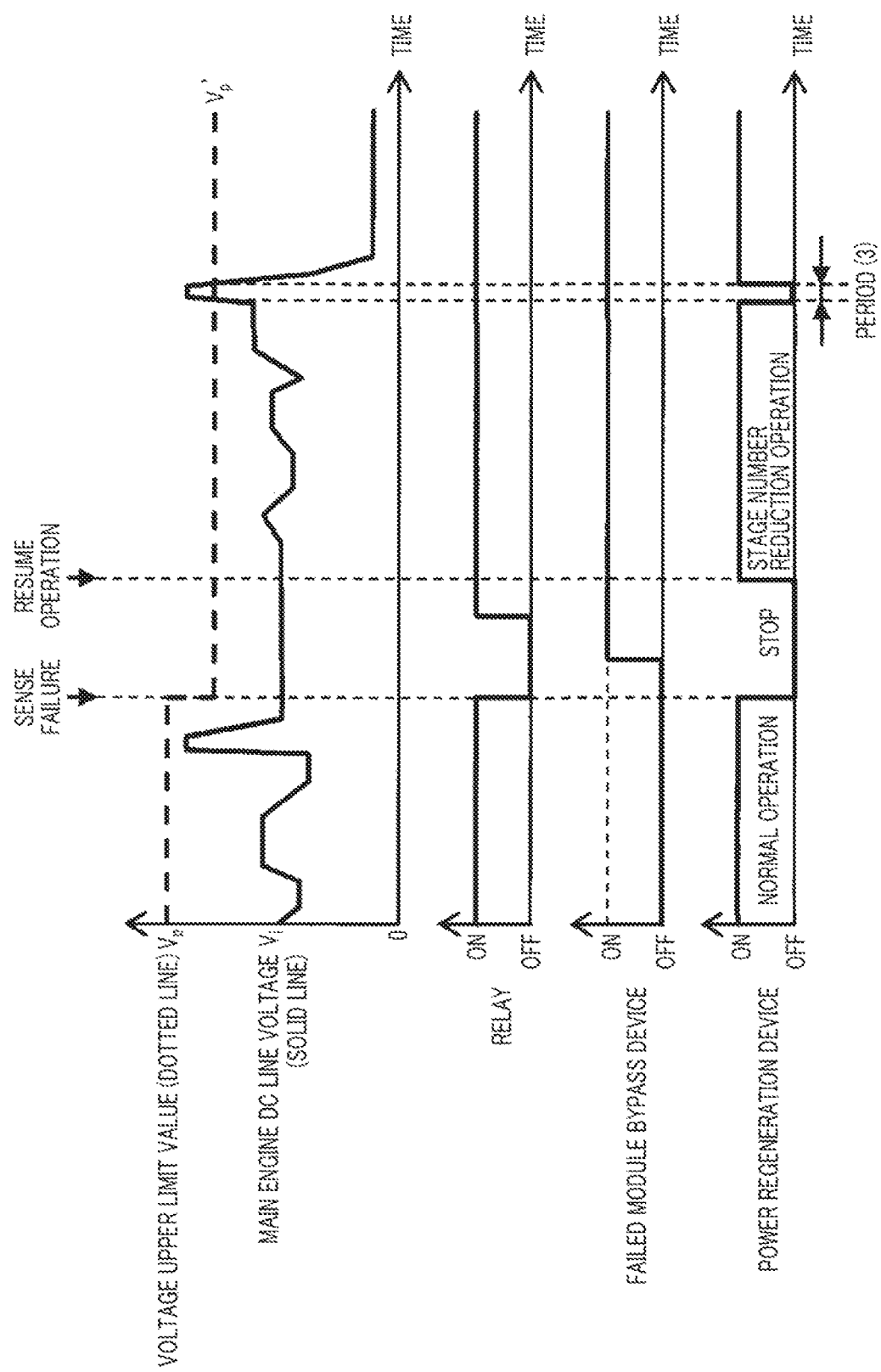
FIG. 11 is a graph showing a temporal change in a overvoltage protection threshold and an input voltage and ON/OFF states of a relay, a bypass device of a power conversion module detected as failed, and a power regeneration device in the processing by the regenerative braking system according to the second embodiment.

At this point, as shown in FIG. 11, the system control section 411A controls, in the normal operation, the relay control section 425 to control the relay 25 to the conduction (ON), and controls the module control section 423 to control the power regeneration device 21 (in this case, the power conversion modules 221 to 22N) to the operation (ON). Moreover, the system control section 411A controls the power generator control section 412 and the power consumption device control section 413 to control the main engine power generator 12 and the power consumption device 15 such that the input voltage Vi is coincident with the voltage set value. When the input voltage Vi exceeds the overvoltage protection threshold Vp, the system control section 411A controls the module control section 423 to control the power regeneration device 21 to the stop (OFF) (see a period (3) of the step number reduction operation for performing similar control).

Subsequently, the controller 41A performs detection of the failed power conversion module by the failure detection section 422 of the power regeneration control section 421 (step S220), and the system control section 411A determines, on the basis of the failure detection signals from the failure detection section 422, whether or not there is the failed power conversion module (step S230). When a determination result at the step S230 is NO, i.e., there is no failed power conversion module, the processing of the steps S200 to S230 is repeated until a determination result of YES is obtained while the normal operation is being continuously performed. Note that the normal operation indicates an operation state in which all of the N power conversion modules 221 to 22N of the power regeneration device 21 are operated.

At this point, as shown in FIG. 11, the system control section 411A controls, in the normal operation, the relay control section 425 to control the relay 25 to the conduction (ON), and controls the module control section 423 to control the power regeneration device 21 (in this case, the power conversion modules 221 to 22N) to the operation (ON). Note that there is no power conversion module detected as failed, and therefore, there is no bypass device performing the control to the short-circuit (ON) by the bypass control section 424. Moreover, the system control section 411A controls the power generator control section 412 and the power consumption device control section 413 to control the main engine power generator 12 and the power consumption device 15 such that the input voltage Vi is coincident with the voltage set value.

In a case where the determination result at the step S230 is YES, i.e., the failure detection signals from the failure detection section 422 include information on the power conversion module detected as failed (hereinafter, a case where failure of the power conversion module 221 has been detected will be described as an example), the system control section 411A controls the relay control section 425 to control the relay 25 to the cutoff (OFF) (step S240), and controls the module control section 423 to control all of the power conversion modules 221 to 22N of the power regeneration device 21 to the stop (OFF) (step S250). Further, the system control section 411A decreases the overvoltage protection threshold Vp to newly set an overvoltage protection threshold Vp2 (step S260). The processing of the steps S240 to S260 corresponds to failure detection timing of FIG. 11. Note that various methods are conceivable for determining the decreased overvoltage protection threshold Vp2, but are for making determination such that at least Vp>Vp2 is satisfied. For example, when some (the power conversion module 221) of the power conversion modules 221 to 22N are stopped, the overvoltage protection threshold Vp2 may be determined such that the overvoltage protection threshold corresponding to one of the unstopped healthy power conversion modules 222 to 22N is not changed. More specifically, when one (e.g., the power conversion module 221) of the N power conversion modules 221 to 22N is stopped, the decreased overvoltage protection threshold Vp2 is set such that Vp/N=Vp2/(N−1) is satisfied.

Subsequently, the system control section 411A controls the bypass control section 424 to control the bypass devices 231 and 241 of the power conversion module 221 detected as failed to the short-circuit (ON) (step S270), and controls the relay control section 425 to control the relay 25 to the conduction (ON) (step S280). The processing of the steps S270 and S280 corresponds to timing between failure detection and operation resumption in FIG. 11.

Subsequently, the system control section 411A acquires the input voltage Vi detected by the voltage sensor 17 (step S290), and determines whether or not the input voltage Vi is higher than the overvoltage protection threshold Vp (step S300). When a determination result at the step S300 is NO, the processing of the steps S290 and S300 is repeated until a determination result of YES is obtained.

When the determination result at the step S300 is NO, the system control section 411A controls the module control section 423 to control the healthy power conversion modules 222 to 22N to the operation (ON) (step S301). Then, transition to the step number reduction operation is completed. The processing of the step S301 corresponds to the operation resumption timing of FIG. 11.

In the step number reduction operation, control is performed such that the input voltage Vi is coincident with the voltage set value as shown in FIG. 11. When the input voltage Vi exceeds the overvoltage protection threshold Vp, the module control section 423 is controlled such that the power regeneration device 21 is controlled to the stop (OFF) (see the period (3)).

A relation between the withstand voltage and an element voltage of a switching element forming the inverter of the power conversion module will be described.

Figure 12:
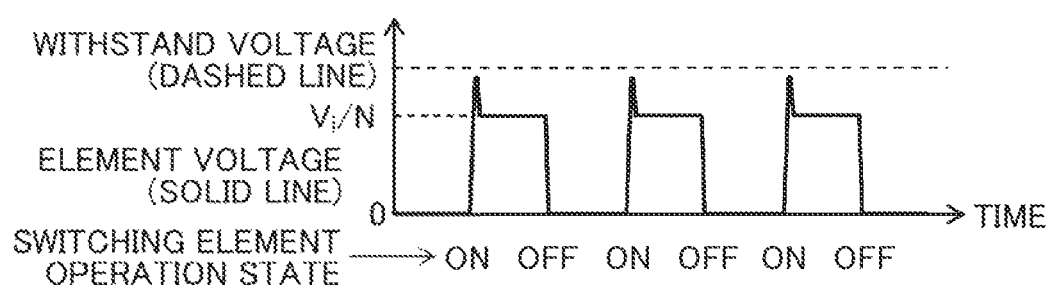
FIG. 12 is a graph showing a temporal change in an element voltage of a switching element in a case where the power conversion module is operated.
Figure 13:
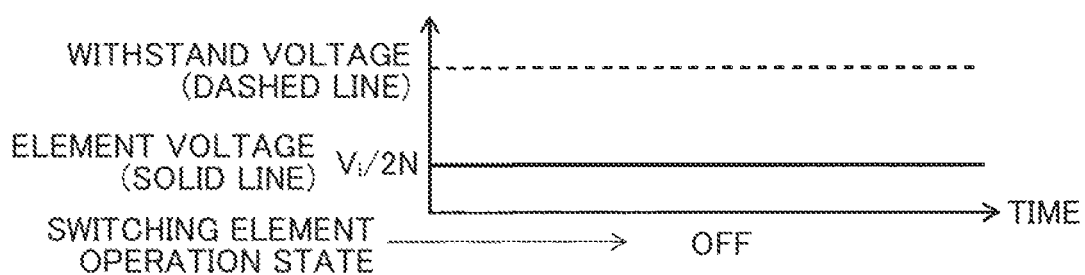
FIG. 13 is a graph showing a temporal change in the element voltage of the switching element in a case where the power conversion module is stopped.

FIG. 12 is a graph showing a temporal change in the element voltage of the switching element in a case where the power conversion module is operated. Moreover, FIG. 13 is a graph showing a temporal change in the element voltage of the switching element in a case where the power conversion module is stopped. Note that the switching element of the inverter 261 of the power conversion module 221 will be described as an example.

When the power conversion module 221 operates as a power conversion section as shown in FIG. 12, the switching element of the inverter 261 are repeatedly turned on and off at intervals, and therefore, the element voltage of the switching element changes at intervals. For example, in an ON state of the switching element, the element voltage is substantially zero. In an OFF state of the switching element, the element voltage and the input voltage to the power conversion module 221 are substantially equal to each other. Note that in FIG. 12, it is assumed that the power regeneration device 21 is in the normal operation and the input voltage to each of the power conversion modules 221 to 22N is Vi/N. When the switching element is turned off, surge voltage is caused, and the element voltage becomes higher than Vi/N transiently. The withstand voltage of the switching element indicated by a dashed line is set considering the surge voltage.

On the other hand, when the power conversion module 221 is stopped as shown in FIG. 13, the switching element is constantly OFF. Thus, the element voltage is constant, and no surge voltage accompanied by switching is caused. In the case of a switching element configuration in which two switching elements are connected in series, the input voltage to the power conversion module 221 is divided by the two switching elements. In FIG. 13, the voltage value is Vi/(2N), assuming that balance between the element voltages of the two switching elements is achieved. As seen from FIG. 13, if the power conversion module 221 is stopped, the margin of the element voltage for the withstand voltage becomes greater.

Other configurations are similar to those of the first embodiment.

In the present embodiment configured as described above, advantageous effects similar to those of the first embodiment can be achieved.

The input voltage to each of the power conversion modules 221 to 22N is higher in the step number reduction operation than in the normal operation. Thus, in the present embodiment, control is performed such that the overvoltage protection threshold Vp is decreased in the step number reduction operation and the power conversion modules 221 to 22N are stopped at the lower input voltage Vi. With this configuration, the step number reduction operation can be performed by the compact lightweight module and therefore by the power regeneration device 21 without the need for increasing the withstand voltage of the module. Further, in the first embodiment, the drivable ranges of the travel motors 10L and 10R are limited for decreasing the voltage upper limit value Vm in the step number reduction operation. However, in the present embodiment, the upper limit value of the input voltage Vi is not decreased, and therefore, the step number reduction operation can be performed without the need for limiting the drivable ranges of the travel motors 10L and 10R.

Note that in the present embodiment, the case where the control of stopping the power regeneration device 21 in a case where the input voltage Vi is higher than the overvoltage protection thresholds Vp and Vp2 is performed in both the normal operation and the step number reduction operation has been described as an example. For example, it may be configured such that, only in the step number reduction operation, the control of stopping the power regeneration device 21 is performed when the input voltage Vi is higher than the overvoltage protection thresholds Vp and Vp2. This can be achieved in such a manner that the overvoltage protection threshold Vp in the normal operation is set higher than the available range of the input voltage Vi. Alternatively, it may be configured such that the overvoltage protection threshold varies according to the number of power conversion modules to be operated in the step number reduction operation.

Other Embodiments

The present invention is not limited to the above-described embodiments, and includes various modifications and combinations made without departing from the gist of the present invention. For example, the control of the voltage Vi of the main engine DC line 16 according to the voltage upper limit values Vm and Vm2 as described in the first embodiment and the control of stopping the power regeneration device 21 according to the overvoltage protection thresholds Vp and Vp2 as described in the second embodiment can be performed at the same time.

FIG. 14 is a graph showing a temporal change in the voltage upper limit value and the input voltage and the ON/OFF states of the relay, the bypass device of the power conversion module detected as failed, and the power regeneration device in the processing by the regenerative braking system in the case of performing the control using the voltage upper limits and the overvoltage protection thresholds.

As shown in FIG. 14, the voltage upper limit value Vm is set higher than the overvoltage protection threshold Vp in the normal operation, and the voltage upper limit value Vm2 in the step number reduction operation is set higher than the overvoltage protection threshold Vp2. In a period (4) in the step number reduction operation in FIG. 14, control is performed such that the input voltage Vi does not exceed the voltage upper limit value Vm2. Moreover, the input voltage Vi is higher than the overvoltage protection threshold Vp2, and therefore, the control of stopping the power regeneration device 21 is performed.

In the above-described configuration, the upper limit of the input voltage Vi can be set on the basis of the withstand voltage of the power conversion module, and a more-reliable regenerative braking system can be achieved.

Next, the characteristics of each of the above-described embodiments will be described.

(1) In the above-described embodiments, in the regenerative braking system including: the first power generator (e.g., the main engine power generator 12) and the second power generator (e.g., the accessory power generator 31) connected to the engine 11; the first rectification circuit (e.g., the rectification circuit 14) connected to the first power generator and rectifying the output power of the first power generator to output the DC power to the first DC line (e.g., the main engine DC line 16); the travel motor inverters 13L and 13R connected to between the first DC line and each of the travel motors 10L and 10R; the power consumption device 15 connected to the first DC line and capable of consuming the power of the first DC line; the second rectification circuit (e.g., the rectification circuit 32) connected to the second power generator and rectifying the output power of the second power generator to output the DC power to the second DC line (e.g., the accessory DC line 34); the accessory device 33 connected to the second DC line; the power regeneration device 21 converting the power of the first DC line to supply the resultant power to the second DC line; and the controller 41, 41A controlling the first power generator, the power consumption device, and the power regeneration device, the power regeneration device includes the plurality of power conversion modules 221 to 22N configured such that the input sections 221a to 22Na to which the power from the first DC line is input are connected in series, and the first bypass device group (e.g., the bypass devices 231 to 23N) connected to the input sections of the plurality of power conversion modules so that the portion between the positive electrode terminal (+) and the negative electrode terminal (−) of each of the input sections can be short-circuited. Further, the controller controls the first power generator, the power consumption device, and the power regeneration device such that the voltage Vi input from the first DC line to the power regeneration device does not exceed the variable upper limit value (e.g., the voltage upper limit value Vm, the overvoltage protection threshold Vp) based on the total of the withstand voltage properties of the plurality of power conversion modules. Furthermore, when some of the plurality of power conversion modules are stopped, the portion between the positive and negative electrode terminals of each of the input sections of the power conversion module to be stopped is short-circuited by the first bypass device group, and the variable upper limit value is decreased according to the withstand voltage properties of the some power conversion modules to be stopped among the plurality of power conversion modules.

With this configuration, the operational continuity can be improved while a device size increase is prevented.

(2) In the above-described embodiments, in the regenerative braking system of (1), the variable upper limit value includes the voltage upper limit value Vm relating to the voltage Vi of the first DC line (e.g., the main engine DC line 16). The controller 41 controls the first power generator (e.g., the main engine power generator 12) and the power consumption device 15 such that the voltage of the first DC line does not exceed the voltage upper limit value, thereby controlling the voltage input to the power regeneration device 21 so as not to exceed the variable upper limit value.

(3) In the above-described embodiments, in the regenerative braking system of (1) or (2), the variable upper limit value includes the overvoltage protection threshold Vp relating to the voltage Vi input to the power regeneration device 21. Each of the plurality of power conversion modules 221 to 22N includes at least one switching element provided for converting the power input from each of the input sections 221a to 22Na. The controller 41A stops operation of all of the switching elements of the plurality of power conversion modules when the voltage Vi of the first DC line (e.g., the main engine DC line 16) reaches the overvoltage protection threshold, thereby controlling the voltage input to the power regeneration device so as not to exceed the variable upper limit value.

(4) In the above-described embodiments, in the regenerative braking system of (2), the variable upper limit value includes the overvoltage protection threshold Vp relating to the voltage input to the power regeneration device 21 and set lower than the voltage upper limit value Vm. Each of the plurality of power conversion modules 221 to 22N includes at least one switching element provided for converting the power input from each of the input sections 221a to 22Na. The controller 41, 41A stops operation of all of the switching elements of the plurality of power conversion modules when the voltage Vi of the first DC line (e.g., the main engine DC line 16) reaches the overvoltage protection threshold, thereby controlling the voltage input to the power regeneration device so as not to exceed the variable upper limit value (e.g., the voltage upper limit value Vp, the overvoltage protection threshold Vp).

(5) In the above-described embodiments, in the regenerative braking system of (1), the output sections 221b to 22Nb of the plurality of power conversion modules 221 to 22N, the output sections 221b to 22Nb outputting the power to the second DC line (e.g., the accessory DC line 34), are connected in series. The power regeneration device 21 includes the second bypass device group (e.g., the bypass devices 241 to 24N) that is connected to each of the output sections of the plurality of power conversion modules and that is able to short-circuit the portion between the positive electrode terminal (+) and the negative electrode terminal (−) of each of the output sections.

(6) In the above-described embodiments, in the regenerative braking system of (1), the output sections 221b to 22Nb of the plurality of power conversion modules 221 to 22N, the output sections 221b to 22Nb outputting the power to the second DC line (e.g., the accessory DC line 34), are connected in parallel.

(7) In the above-described embodiments, in the regenerative braking system of (1), the controller 41, 41A increases the variable upper limit value (e.g., the voltage upper limit value Vm, the overvoltage protection threshold Vp) as the number of power conversion modules not to be stopped in a case where some of the plurality of power conversion modules are to be stopped increases.

(8) In the above-described embodiments, the regenerative braking system of (1) further includes the relay 25 that is able to cut off the power input from the first DC line (the main engine DC line 16) to the power regeneration device 21. The controller 41, 41A is configured to, when some of the plurality of power conversion modules are to be stopped, cut off the power input to the power regeneration device by the relay, stop all of the plurality of power conversion modules, and short-circuit the portion between the positive electrode terminal (+) and the negative electrode terminal (−) of each of the input sections of the some of the plurality of power conversion modules to be stopped by the first bypass device group (e.g., the bypass devices 231 to 23N) after the variable upper limit value (e.g., the voltage upper limit value Vm, the overvoltage protection threshold Vp) has been decreased. The controller 41, 41A is configured to bring the power input to the power regeneration device into conduction by the relay after the portion between the positive and negative electrode terminals of each of the input sections of the power conversion modules to be stopped has been short-circuited. The controller 41, 41A is configured to resume operation of the power conversion modules not to be stopped after the power input to the power regeneration device has been brought into conduction.

(9) In the above-described embodiments, the electrically-driven work vehicle includes the engine 11, the regenerative braking system of (1), and the drive wheels 3L and 3R driven by the travel motors 10L and 10R that are operated by the power output from the first power generator (e.g., the main engine power generator 12) to the first DC line (e.g., the main engine DC line 16) through the first rectification circuit (e.g., the rectification circuit 14) in the regenerative braking system and that output the regenerative power to the first DC line.

(10) In the above-described embodiment, in the regenerative braking system of (1), the plurality of power conversion modules have equivalent withstand voltage characteristics, and when some of these power conversion modules are stopped, the variable upper limit value is decreased according to the number of power conversion modules to be stopped.

REMARKS

Note that the present invention is not limited to the above-described embodiments, and includes various modifications and combinations made without departing from the gist of the present invention. Moreover, the present invention is not limited to one including all configurations described above in the embodiments, and also includes one from which some of these configurations are omitted. Further, some or all of the configurations, functions, and the like described above may be implemented by, e.g., designing as an integrated circuit. In addition, each of the configurations, functions, and the like described above may be implemented by software in such a manner that a processor interprets and executes a program for implementing each function.

DESCRIPTION OF REFERENCE CHARACTERS

1: Vehicle body frame
2L, 2R: Driven wheel (front wheel)
3aL, 3aR: Decelerator
3L, 3R: Drive wheel (rear wheel)
4: Cabin
5: Bed (vessel)
5a: Pin joint portion
6: Hoist cylinder
7: Grid box
8: Control cabinet
9: Fuel tank
10L, 10R: Travel motor
11: Engine
12: Main engine power generator
13L, 13R: Inverter
14: Rectification circuit
15: Power consumption device
16: Main engine DC line
17: Voltage sensor
21, 21A: Power regeneration device
221 to 22N: Power conversion module
221a to 22Na: Input section
221b to 22Nb: Output section
231 to 23N, 241 to 24N: Bypass device
25: Relay
26N: Inverter
31: Accessory power generator
32: Rectification circuit
33: Accessory device
34: Accessory DC line
41, 41A: Controller
100: Electrically-driven dump truck
151: Resistor
152: Switching element
153: Diode
261: Inverter
271: Transformer
281: Rectification circuit
411, 411A, 412: System control section
413: Power consumption device control section
414: Voltage upper limit value setting section
421: Power regeneration control section
422: Failure detection section
423: Module control section
424: Bypass control section
425: Relay control section
426: Timing control section

The invention claimed is:

1. A regenerative braking system comprising:
a first power generator and a second power generator that are connected to an engine;
a first rectification circuit that is connected to the first power generator and rectifies an output power of the first power generator to output a DC power to a first DC line;
an inverter that is connected between the first DC line and a travel motor;
a power consumption device that is connected to the first DC line and is able to consume the power of the first DC line;
a second rectification circuit that is connected to the second power generator and rectifies an output power of the second power generator to output a DC power to a second DC line;
an accessory device that is connected to the second DC line;
a power regeneration device that converts the power of the first DC line to supply a converted power to the second DC line; and
a controller that controls the first power generator, the power consumption device, and the power regeneration device,
wherein the power regeneration device includes:
a plurality of power conversion modules configured such that input sections of the plurality of power conversion modules, to which the power of the first DC line is input, are connected in series, and
a first bypass device group that is connected to each of the input sections of the plurality of power conversion modules, wherein the first bypass device group is able to individually short-circuit a portion of circuits between positive and negative electrode terminals of each of the input sections of the plurality of power conversion modules,
wherein the controller is configured to:
control the first power generator, the power consumption device, and the power regeneration device such that a voltage input from the first DC line to the power regeneration device does not exceed a variable upper limit value based on a total voltage withstandable by the plurality of power conversion modules, and
short-circuit, when some of the plurality of power conversion modules are stopped, one or more of the circuits between the positive and negative electrode terminals of each of the input sections of the plurality of power conversion modules to be stopped and decrease the variable upper limit value based on a total voltage withstandable by the ones of the plurality of power conversion modules not to be stopped.

2. The regenerative braking system according to claim 1, wherein
the variable upper limit value includes a voltage upper limit value relating to a voltage of the first DC line, and
the controller controls the first power generator and the power consumption device such that the voltage of the first DC line does not exceed the voltage upper limit value, thereby controlling the voltage input to the power regeneration device so as not to exceed the variable upper limit value.

3. The regenerative braking system according to claim 1, wherein
the variable upper limit value includes an overvoltage protection threshold relating to the voltage input to the power regeneration device,
each of the plurality of power conversion modules includes at least one switching element provided for converting a power input from each of the input sections of the plurality of power conversion modules, and
the controller stops operation of all of the switching elements of the plurality of power conversion modules when the voltage of the first DC line reaches the overvoltage protection threshold, thereby controlling the voltage input to the power regeneration device so as not to exceed the variable upper limit value.

4. The regenerative braking system according to claim 2, wherein
the variable upper limit value includes an overvoltage protection threshold relating to the voltage input to the power regeneration device and set lower than the voltage upper limit value,
each of the plurality of power conversion modules includes at least one switching element provided for converting a power input from each of the input sections of the plurality of power conversion modules, and
the controller stops operation of all of the switching elements of the plurality of power conversion modules when the voltage of the first DC line reaches the overvoltage protection threshold, thereby controlling the voltage input to the power regeneration device so as not to exceed the variable upper limit value.

5. The regenerative braking system according to claim 1, wherein
output sections of the plurality of power conversion modules, the output sections outputting a power to the second DC line, are connected in series, and
the power regeneration device includes a second bypass device group that is connected to each of the output sections of the plurality of power conversion modules and that is able to short-circuit a portion of circuits between positive and negative electrode terminals of each of the output sections.

6. The regenerative braking system according to claim 1, wherein
output sections of the plurality of power conversion modules, the output sections outputting a power to the second DC line, are connected in parallel.

7. The regenerative braking system according to claim 1, wherein
the controller increases the variable upper limit value as the number of power conversion modules not to be stopped in a case where some of the plurality of power conversion modules are to be stopped increases.

8. The regenerative braking system according to claim 1, further comprising:
a relay that is able to cut off a power input from the first DC line to the power regeneration device, wherein
the controller is configured to, when the some of the plurality of power conversion modules are to be stopped,
cut off the power input to the power regeneration device by the relay, stop all of the plurality of power conversion modules, and short-circuit the portion of circuit between the positive and negative electrode terminals of each of the input sections of the plurality of power conversion modules to be stopped by the first bypass device group after the variable upper limit value has been decreased,
bring the power input to the power regeneration device into conduction by the relay after the portion of the circuits between the positive and negative electrode terminals of each of the input sections of the plurality of power conversion modules to be stopped has been short-circuited, and
resume operation of the power conversion modules not to be stopped after the power input to the power regeneration device has been brought into the conduction.

9. An electrically-driven work vehicle comprising: an engine;
the regenerative braking system according to claim 1; and
a drive wheel driven by a travel motor that is operated by the power output from the first power generator to the first DC line through the first rectification circuit in the regenerative braking system and that outputs a regenerative power to the first DC line.

10. The regenerative braking system according to claim 1, wherein
the plurality of power conversion modules have
equivalent withstand voltage, and when some of the plurality of power conversion modules are stopped, the variable upper limit value is decreased according to the number of the some of the plurality of power conversion modules to be stopped.

11. The regenerative braking system according to claim 2, wherein
the variable upper limit value includes an overvoltage protection threshold relating to the voltage input to the power regeneration device,
each of the plurality of power conversion modules includes at least one switching element provided for converting a power input from each of the input sections, and
the controller stops operation of all of the switching elements of the plurality of power conversion modules when the voltage of the first DC line reaches the overvoltage protection threshold, thereby controlling the voltage input to the power regeneration device so as not to exceed the variable upper limit value.

* * * * *